(12) United States Patent
Hong et al.

(10) Patent No.: US 11,206,192 B2
(45) Date of Patent: Dec. 21, 2021

(54) TROUBLESHOOTING VIRTUAL NETWORK REACHABILITY

(71) Applicant: Nicira, Inc., Palo Alto, CA (US)

(72) Inventors: Xinhua Hong, Milpitas, CA (US); Ronghua Zhang, San Jose, CA (US); David J. Leroy, Palo Alto, CA (US); Yong Wang, Sunnyvale, CA (US); Jia Yu, Sunnyvale, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 16/290,900

(22) Filed: Mar. 2, 2019

(65) Prior Publication Data

US 2019/0199600 A1 Jun. 27, 2019

Related U.S. Application Data

(63) Continuation of application No. 15/089,589, filed on Apr. 4, 2016, now Pat. No. 10,237,142.

(51) Int. Cl.
*H04L 12/24* (2006.01)
*H04L 12/26* (2006.01)

(52) U.S. Cl.
CPC .......... *H04L 41/22* (2013.01); *H04L 41/0677* (2013.01); *H04L 43/065* (2013.01); *H04L 43/0823* (2013.01)

(58) Field of Classification Search
CPC ... H04L 41/22; H04L 41/0677; H04L 43/065; H04L 43/0823
See application file for complete search history.

(56) References Cited

U.S. PATENT DOCUMENTS

| | | | |
|---|---|---|---|
| 8,958,298 B2 | 2/2015 | Zhang et al. | |
| 9,319,375 B2 | 4/2016 | Gross et al. | |
| 2003/0086425 A1* | 5/2003 | Bearden | H04M 3/2236 370/392 |
| 2003/0091165 A1* | 5/2003 | Bearden | H04L 41/22 379/88.08 |
| 2003/0097438 A1* | 5/2003 | Bearden | H04L 41/12 709/224 |
| 2009/0003223 A1* | 1/2009 | McCallum | H04L 45/28 370/244 |
| 2013/0044636 A1 | 2/2013 | Koponen et al. | |
| 2013/0227336 A1* | 8/2013 | Agarwal | H04L 45/22 714/4.3 |

(Continued)

*Primary Examiner* — Kristie D Shingles
(74) *Attorney, Agent, or Firm* — Adeli LLP

(57) ABSTRACT

A novel method for troubleshooting a logical network is provided. The logical network has logical forwarding elements operating inside virtual network forwarding engines. The method receives a source identifier and a destination identifier that correspond to nodes in the logical network. The method then retrieves a set of network data from a virtual network forwarding engine and identifies a path in the logical network by traversing the logical network according to the retrieved set of network data. This traversal starts at an initial network node that is identified by the source identifier and continues through a set of next-hop network nodes that are each identified based on the destination identifier. At least some of the network nodes are logical ports associated with logical forwarding elements implemented by the virtual network forwarding engine. The method then reports the set of traversed logical nodes.

20 Claims, 16 Drawing Sheets

(56) References Cited

U.S. PATENT DOCUMENTS

| | | | |
|---|---|---|---|
| 2015/0016286 A1* | 1/2015 | Ganichev | H04L 45/586 370/252 |
| 2015/0016469 A1* | 1/2015 | Ganichev | H04L 49/90 370/429 |
| 2015/0381578 A1* | 12/2015 | Thota | H04L 63/0428 713/168 |
| 2017/0288981 A1 | 10/2017 | Hong et al. | |
| 2020/0220793 A1* | 7/2020 | Hira | H04L 43/065 |

* cited by examiner get path

901
interface:    0000000e-0000-0000-0000-000000000000
interface:    0000000c-0000-0000-0000-000000000000
port :        0000000b-0000-0000-0000-000000000000
port :        00000009-0000-0000-0000-000000000000
interface :   0000000a-0000-0000-0000-000000000000
interface :   00000018-0000-0000-0000-000000000000
port :        00000017-0000-0000-0000-000000000000
port :        00000019-0000-0000-0000-000000000000
interface :   0000001a-0000-0000-0000-000000000000
interface :   00000015-0000-0000-0000-000000000000
port :        00000014-0000-0000-0000-000000000000
port :        00000012-0000-0000-0000-000000000000
interface :   00000013-0000-0000-0000-000000000000
interface :   0000001c-0000-0000-0000-000000000000
port :        0000001b-0000-0000-0000-000000000000 get forwarding

902
```
{
"encap": "STT",
"mac-table": [
{
"ifuid": 294,
"ifuuid": "00000009-0000-0000-0000-000000000000",
"mac": "c2:81:09:00:00:00"
},
{
"ifuid": 295,
"ifuuid": "0000000b-0000-0000-0000-000000000000",
"mac": "c2:81:09:00:00:01"
}
],
"repl": "source",
"uuid": "00000008-0000-0000-0000-000000000000",
"vni": 101
}
```

*Figure 9* get path

| | |
|---|---|
| interface: | 0000000e-0000-0000-0000-000000000000 |
| interface: | 0000000c-0000-0000-0000-000000000000 |
| port : | 0000000b-0000-0000-0000-000000000000 |
| port : | 00000009-0000-0000-0000-000000000000 |
| interface : | 0000000a-0000-0000-0000-000000000000 |
| interface : | 00000018-0000-0000-0000-000000000000 |
| port : | 00000017-0000-0000-0000-000000000000 |
| port : | 00000019-0000-0000-0000-000000000000 |
| interface : | 0000001a-0000-0000-0000-000000000000 |
| interface : | 00000015-0000-0000-0000-000000000000 |
| port : | 00000014-0000-0000-0000-000000000000 |
| port : | 00000012-0000-0000-0000-000000000000 |
| interface : | 00000013-0000-0000-0000-000000000000 |
| interface : | 0000001c-0000-0000-0000-000000000000 |
| port : | 0000001b-0000-0000-0000-000000000000 |

1001 get current

```
{
"ifuid": 305,
"ifuuid": "00000012-0000-0000-0000-000000000000",
"lswitch": "00000011-0000-0000-0000-000000000000",
"peer": "00000013-0000-0000-0000-000000000000",
"stats": {
        "rx_bytes": 0,
        "rx_drop_l2_loop": 0,
        "rx_drop_malformed": 0,
        "rx_drop_no_match": 0,
        "rx_drops": 0,
        "rx_pkts": 0,
        "tx_bytes": 0,
        "tx_drop_no_mem": 0,
        "tx_drops": 0,
        "tx_pkts": 0
        }
}
```

*get stats*

| UUID : | RX PKTS | RX BYTES | TX PKTS | TX BYTES | RX Drops | TX Drops |
|---|---|---|---|---|---|---|
| 0000000e-0000-0000-0000-000000000000: | 0 | 0 | 10 | 816 | 0 | 0 |
| 0000000c-0000-0000-0000-000000000000: | 0 | 0 | 9 | 738 | 0 | 0 |
| 0000000b-0000-0000-0000-000000000000: | 0 | 0 | 9 | 738 | 0 | 0 |
| 00000009-0000-0000-0000-000000000000: | 0 | 0 | 9 | 738 | 0 | 0 |
| 0000000a-0000-0000-0000-000000000000: | 9 | 738 | 0 | 0 | 9 | 0 |
| 00000018-0000-0000-0000-000000000000: | 0 | 0 | 0 | 0 | 0 | 0 |
| 00000017-0000-0000-0000-000000000000: | 0 | 0 | 0 | 0 | 0 | 0 |
| 00000019-0000-0000-0000-000000000000: | 0 | 0 | 0 | 0 | 0 | 0 |
| 0000001a-0000-0000-0000-000000000000: | 0 | 0 | 0 | 0 | 0 | 0 |
| 00000015-0000-0000-0000-000000000000: | 0 | 0 | 0 | 0 | 0 | 0 |
| 00000014-0000-0000-0000-000000000000: | 0 | 0 | 0 | 0 | 0 | 0 |
| 00000012-0000-0000-0000-000000000000: | 0 | 0 | 0 | 0 | 0 | 0 |
| 00000013-0000-0000-0000-000000000000: | 0 | 0 | 0 | 0 | 0 | 0 |
| 0000001c-0000-0000-0000-000000000000: | 0 | 0 | 0 | 0 | 0 | 0 |
| 0000001b-0000-0000-0000-000000000000: | 0 | 0 | 0 | 0 | 0 | 0 |

TROUBLESHOOTING VIRTUAL NETWORK REACHABILITY

CLAIM OF BENEFIT TO PRIOR APPLICATION

This application is a continuation of U.S. patent application Ser. No. 15/089,589, filed Apr. 4, 2016, now published as U.S. Patent Publication 2017/0288981. U.S. patent application Ser. No. 15/089,589, now published as U.S. Patent Publication 2017/0288981, is hereby incorporated by reference.

BACKGROUND

A virtual network forwarding engine such as NSX Edge®, unlike those traditional physical network router or switch, has thousands of logical routers and logical switches and tens of thousands of logical ports. In contrast to a network packet in a physical router or switch that may only hop from one port to another, the forwarding path in one NSX Edge of today may pass through twenty or more logical ports and interfaces. The number of the logical entities that one packet may traverse in one such virtual network forwarding engine creates network reachability issues that complicate troubleshooting efforts.

Unlike control plane or management plane engines that readily provide GUI user interfaces to assist troubleshooting by network admins, the data-forwarding plane usually rely on CLIs (command line interface) as the user interface for debugging network forwarding issue. Such a CLI typically displays only the configuration and forwarding information. This is insufficient information for troubleshooting the operations of a virtual network forwarding engine, because the network admin doesn't even know which logical entity to display. Such troubleshooting effort generally requires significant investment in human labor in identifying the relevant logical entities from a sea of meaningless computer generated identifiers.

SUMMARY

Some embodiments of the invention provide a method for troubleshooting a logical network that has logical forwarding elements operating inside virtual network forwarding engines. The method receives a source identifier and a destination identifier that correspond to nodes in the logical network. The method then retrieves a set of network data from a virtual network forwarding engine and identifies a path in the logical network by traversing the logical network according to the retrieved set of network data. This traversal starts at an initial network node that is identified by the source identifier and continues through a set of next-hop network nodes that are each identified based on the destination identifier. At least some of the network nodes are logical ports associated with logical forwarding elements implemented by the virtual network forwarding engine. The method then reports the set of traversed logical nodes.

A troubleshooting system according to some embodiments of the invention retrieves a set of network data from a virtual network forwarding engine, identifies a path in the logical network by traversing a set of nodes in the logical network, and reports the set of traversed network nodes through a user interface (command line interface of graphical user interface). The traversal of the network node is done according to the set of network data retrieved from the virtual network engine. In other words, the virtual network engine from which the network data is retrieved is the engine that is being monitored, and the troubleshooting system is for identifying errors in operations of the monitored virtual network forwarding engine through the retrieved network data.

In some embodiments, the troubleshooting system identifies the requested path by emulating the forwarding/switching/routing of a packet by the virtual network forwarding engine. The troubleshooting system does so by performing packet forwarding operations based on the content of network data retrieved from the virtual network forwarding engine, which includes information about the logical forwarding elements operated by the virtual network forwarding engine. These information includes mapping/specification of connections between the various logical forwarding elements as well as forwarding tables and routing tables of the various logical forwarding elements.

In some embodiments, the user interface of the troubleshooting system has a command line interface (CLI). In some embodiments, the CLI displays the reported traversal path as a list of logical ports, and the troubleshooting CLI allows the user to navigate through the reported path and to select a particular logical port or network node for detailed information.

In some embodiments, the CLI receives a selection a logical port from the reported set of traversed logical ports and reports a set of information related to the selected logical port. In some embodiments, the set of reported information can be of a logical forwarding element that the selected logical port is attached to, and the CLI provides a corresponding command. In some embodiments, such information includes a routing table and/or a forwarding table used by the logical forwarding element.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 9 illustrates the selection of a logical port and the reporting of information related to the selected logical port.

FIG. 11 illustrates the selection of a logical port and the reporting of current information related to the selected logical port.

FIG. 12 illustrates the reporting of packet statistics for all nodes in the traversed path.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a method for troubleshooting a logical network that has logical forwarding elements operating inside virtual network forwarding engines. The method receives a source identifier and a destination identifier that correspond to nodes in the logical network. The method then retrieves a set of network data from a virtual network forwarding engine and identifies a path in the logical network by traversing the logical network according to the retrieved set of network data. This traversal starts at an initial network node that is identified by the source identifier and continues through a set of next-hop network nodes that are each identified based on the destination identifier. At least some of the network nodes are logical ports associated with logical forwarding elements implemented by the virtual network forwarding engine. The method then reports the set of traversed logical nodes.

Figure 1:
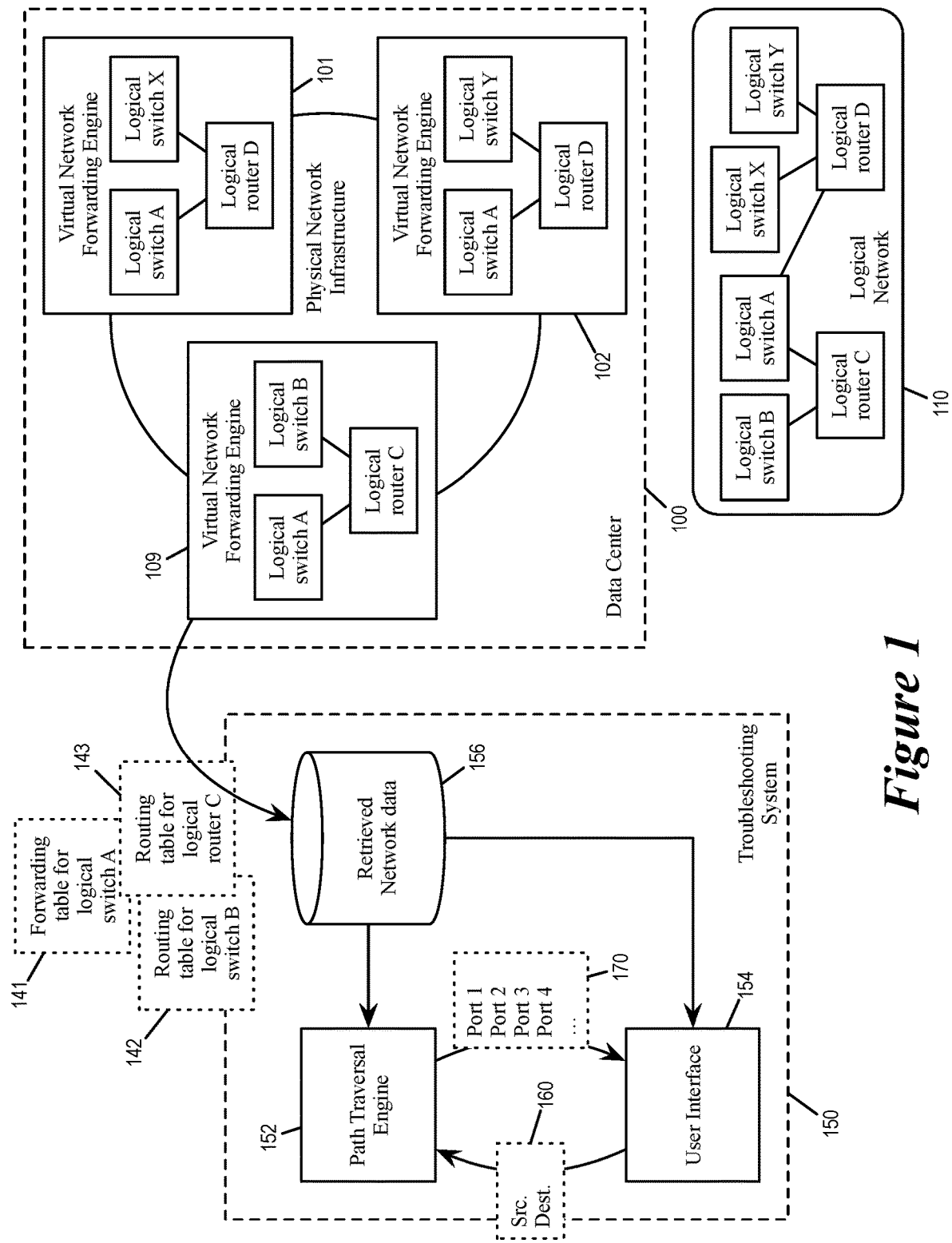
FIG. 1 illustrates the troubleshooting of a logical network that has logical forwarding elements operating inside a set of virtual network forwarding engines.

FIG. 1 illustrates the troubleshooting of a logical network that has logical forwarding elements operating inside a set of virtual network forwarding engines. The figure illustrates virtual network forwarding engines 101-109 of a data center 100. Each of the virtual network forwarding engines 101-109 is operating one or more logical forwarding elements or other components of a logical network 110. The figure also illustrates a troubleshooting system 150 for troubleshooting the logical network 110. The trouble system 150 has path traversal engine 152, a user interface 154, and a storage 156 for storing network data retrieved from a virtual network forwarding engine (e.g., the virtual forwarding engine 109).

The data center 100 in some embodiments provides a collection of computing and networking resources to various tenants or subscribers. In some embodiments, the networking and computing resources are configured to provide a virtualized environment that includes virtual machines (VMs) and logical networks (e.g., 110). In some embodiments, these networking and computing resources are provided by computing devices that are referred to as host machines that operate or "host" virtual machines and various components of the logical networks. The host machines are physically interconnected by a physical network infrastructure, which can be wired or wireless communication mediums that physically relay signals and data between the different host machines.

The logical network 110 is a virtualized network implemented or operated by the host machines of the data center 100. In some embodiments, a logical network is a multi-tenant logical network, wherein the logical network includes several tenant logical networks that are interconnected by provider logical switches and routers. In some embodiments, a logical network consists of components that are implemented by the computing devices of data center. Some of these virtualized network components are logical forwarding elements for performing various packet-forwarding operations. Such logical forwarding elements may include L3 logical routers of various tenant logical networks, L2 logical switches that correspond to network segments having specific VNIs (virtual network identifier), service routers that provide network services at L4 through L7, and transit logical switches between different provider logical networks and tenant logical networks, etc. The example logical network 100 of FIG. 1 has logical switches A, B, X, and Y as well as logical routers C and D.

In some embodiments, some of the logical forwarding elements of a logical network are distributed, i.e., the logical forwarding element has multiple instances that are operating in different host machines in a distributed manner. In the example of FIG. 1, the logical switches A, X and the logical router D are distributed logical forwarding elements that operate in a distributed manner that spans virtual network forwarding engines 101-109. In some embodiments, some of the logical forwarding elements of are centralized, i.e., having only one instance that operates in or is active in only one host machine. In the example of FIG. 1, the logical switch B and the logical router C are centralized at the virtual network forwarding engine 109 and the logical switch Y is centralized the virtual network forwarding engine 102. Section I below describes logical networks and logical forwarding elements in greater detail.

In some embodiments, the packet forwarding operations of the various logical forwarding elements are performed by the host machines that host/operate these logical forwarding elements. In some embodiments, the host machines execute the software (e.g., hypervisors, virtualization software, managed forwarding element, etc.) that performs/executes the instructions for performing operations of the logical forwarding elements. Some embodiments therefore refer to these host machines that perform the packet forwarding operations of the logical forwarding elements as virtual network forwarding engines. In other words, the virtual network forwarding engines 101-109 are also host machines 101-109 of the data center 100. Section IV below describes a computing device that serves as a host machine/virtual network forwarding engine in greater detail.

The troubleshooting system 150 performs the troubleshooting of the logical network 100 by retrieving network data from one or more of the virtual network forwarding engines. The retrieved network data is stored at the storage 156 and is used by a path traversal engine 152 for identifying a packet-traversal path 170 in the logical network 110. The user interface 152 of the troubleshooting system 150 provides a troubleshooting request 160 that specifies a source identifier and a destination identifier. The path traversal engine 152 in turn uses the source identifier to identify the start of the path, and then identifies the network nodes in the logical network 110 that would be traversed by a packet whose destination address correspond to the destination identifier. In other words, the path traversal engine 152 produces the path 170 by emulating the forwarding of such a packet according to the content of the retrieved network data.

In some embodiments, such retrieved network data contains routing table entries and forwarding table entries of the various logical forwarding elements. In this example, the troubleshooting system 150 performs its troubleshooting tasks based on network data retrieved from the virtual network forwarding engine 109, hence the network data retrieved are those of the logical switches A and B and the logical router C operating in the virtual network forwarding engine 109 (illustrated as forwarding tables 141-142 for the logical switches A and B as well as routing table 143 for the logical router C). In some embodiment, the retrieved network data also includes specifications for interconnection mapping between the different logical forwarding elements (e.g., which logical port of which logical switch connects with which logical interface of which logical router, etc.).

I. Logical Network

In some embodiments, the troubleshooting system 150 uses the retrieved network data of just one virtual network forwarding engine. Some embodiments perform logical network troubleshooting based on only a virtual network forwarding engine that situates at the edge of the logical network. Such an edge (or gateway) virtual network forwarding engine performs packet forwarding operations between the logical network (e.g., 110) and external physical networks that are inside or outside of the data center (e.g., Internet).

Figure 2:
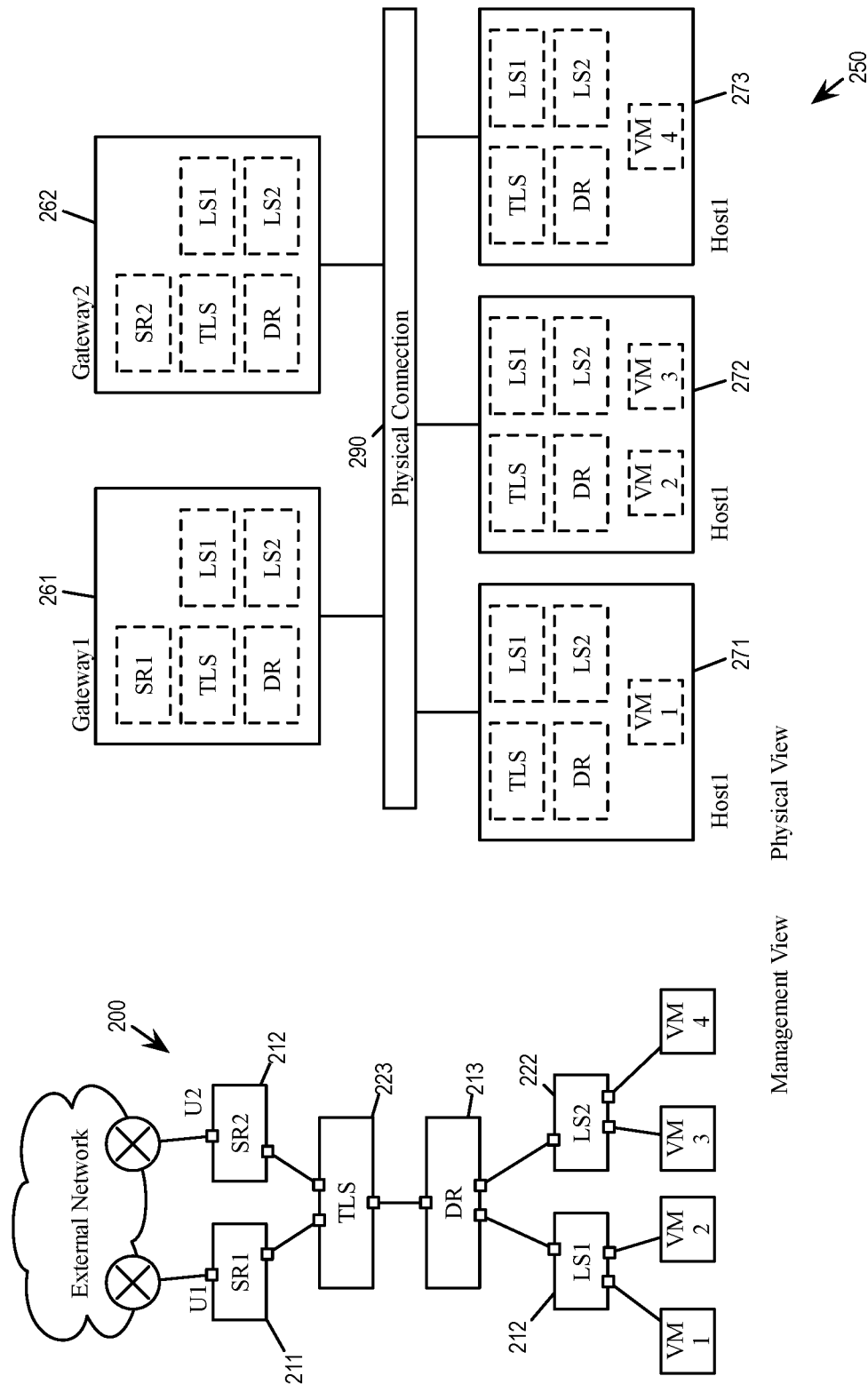
FIG. 2 illustrates an example logical network with logical forwarding elements that are implemented in different virtual network forwarding engines or host machines.

FIG. 2 illustrates an example logical network 200 with logical forwarding elements that are implemented in different virtual network forwarding engines or host machines. Some of the host machines serve as edge or gateway the logical network, while others host machines situate at the core of the data center. The logical network 200 has both distributed and centralized logical entities. The figure illustrates a logical view and a physical view of the logical network 200. The logical view of the logical network 200 shows the logical relationship and connection between the various logical entities of the network. The physical view of the logical network 200 shows the physical instantiation of the various logical entities in the physical host machines and the physical gateways of the datacenter.

According to the logical view, the logical network 200 includes service routers 211 and 212 (SR1 and SR2), logical switches 221, 222, and 223 (LS1, LS2, and TLS), and distributed router 213 (DR). Among these logical entities, the service routers SR1 and SR2 are centralized logical entities, while LS1, LS2, TLS and DR are distributed logical entities.

Some embodiments provide a distributed logical router implementation that enables first-hop routing in a distributed fashion (rather than concentrating all of the routing functionality at the gateways). In the physical realization, the logical router of some embodiments includes a single distributed routing component (also referred to as a distributed router or a DR) and one or more service routing components (also referred to as service routers or SRs). The DR, in some embodiments, spans managed forwarding elements (MFEs) that couple directly with virtual machines (VMs) or other data compute nodes that are logically connected, directly or indirectly, to the logical router. The DR of some embodiments also spans the gateways to which the logical router is bound as well as one or more physical routers that are capable of performing routing operations. The DR of some embodiments is responsible for first-hop distributed routing between logical switches and/or other logical routers that are logically connected to the logical router. The service routers (SRs) span only the edge nodes of the logical networks and are responsible for delivering services that are not implemented in a distributed fashion (e.g., some stateful services).

The physical view of the network shows the physical instantiation of these centralized and distributed logical entities in the actual physical machines of a datacenter 250. As illustrated, the datacenter 250 includes gateways 261-262 and host machines 271-273 that are interconnected by physical connection 290. The instances of the distribute elements TLS, LS1, LS2, and DR are distributed across the gateways 261-262 and the host machines 271-273. In some embodiments, different physical instances of a distributed element operate according to a same set of forwarding tables. The centralized element SR1 is active only in the gateway 261 while the centralized element SR2 is active only in the gateway 262.

In some embodiments, the datacenter supports multiple logical networks for multiple different tenants. These multiple tenant logical networks are brought together by a provider logical network to form one overall logical network (or referred to as the logical network of the data center, such as the logical network 110).

In some embodiments, different tenant logical networks share a same set of gateway machines, and each of the gateway machines provides packet switching, forwarding, routing operations for all of the connected tenant logical networks. In some embodiments, a gateway is a virtual network forwarding engine that implements logical entities for multiple different tenant logical networks as well as a provider logical network.

In some embodiments, the overall logical network of a datacenter is implementing a two-tier logical network structure. These tiers include a top tier of a provider logical router (PLR) and a lower tier of tenant logical routers (TLRs), in some embodiments. The two-tiered structure enables both the provider (e.g., datacenter owner) and the tenant (e.g., datacenter customer, often one of many such customers) control over their own services and policies. In some embodiments, the PLR layer is the logical layer that interfaces with external physical networks, and therefore dynamic routing protocols (e.g., BGP) may be configured on the PLR to enable the exchange of routing information with physical routers outside the datacenter. Some embodiments also allow the configuration of bidirectional forwarding detection (BFD) or similar protocols for monitoring whether physical network routers are active and operational. Some datacenters may not have multiple tenants, in which case the need for separate PLR and TLRs is removed. In such cases, some embodiments use a single-tier logical router topology, with the single tier having the functionality of PLRs. The two-tier logical topology of some embodiments is described in greater detail in U.S. patent application Ser. No. 14/222,557, filed Mar. 21, 2014 and published as U.S. Patent Application Publication No. 2015/0271303, which is incorporated herein by reference.

The two-tier structure of some embodiments includes (1) a single logical router (referred to as a provider logical router (PLR) and administered by, e.g., the owner of the datacenter) for connecting the logical network to a network external to the datacenter, and (2) multiple logical routers (each referred to as a tenant logical router (TLR) and administrated by, e.g., different tenants of the datacenter) that connect to the PLR and do not separately communicate with the external network. In some embodiments, the control plane defines a transit logical switch (TLS) between the distributed component of the PLR and the service components of the TLR.

Figure 3:
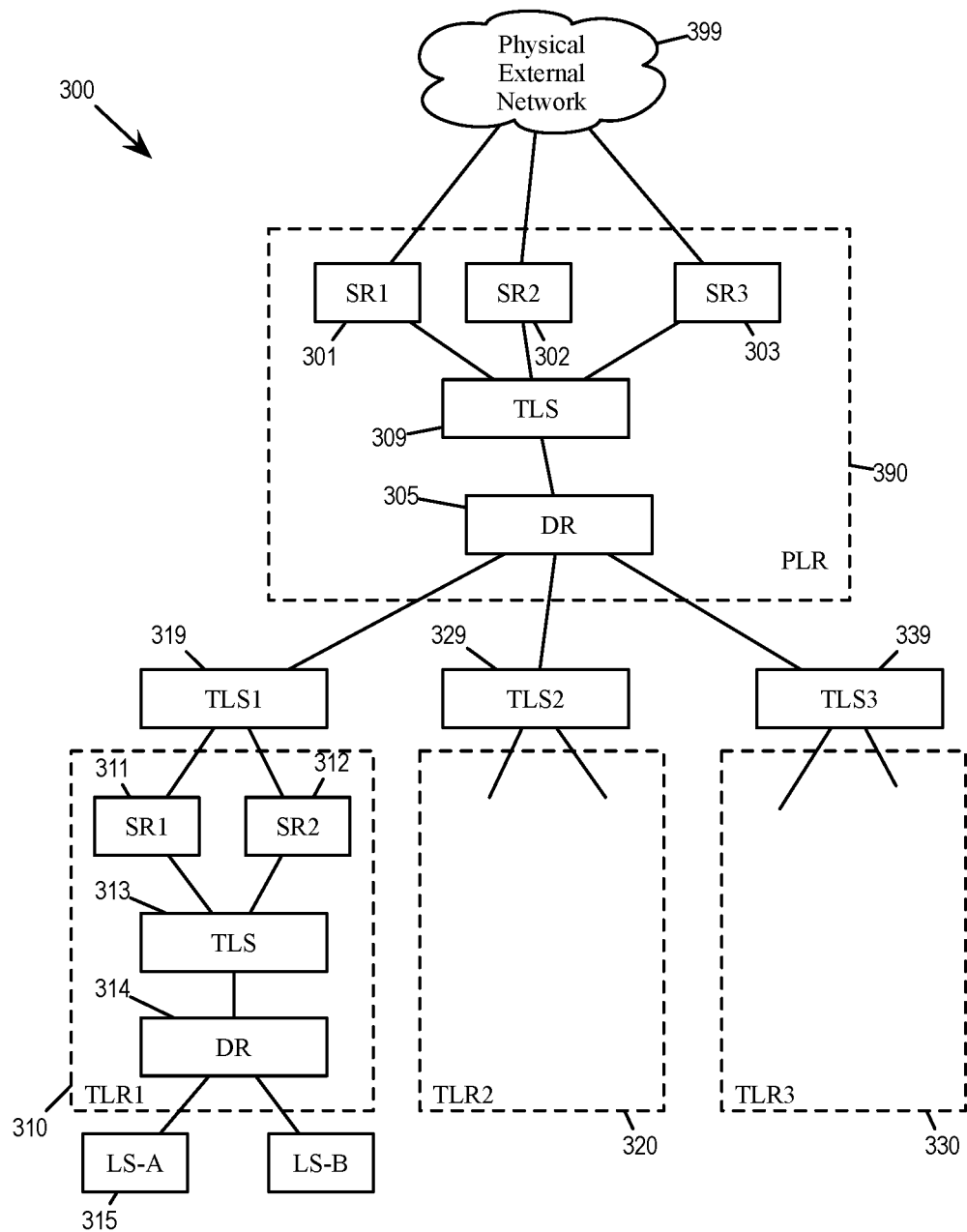
FIG. 3 illustrates a logical view of a datacenter that is implementing a logical network.

FIG. 3 illustrates a logical view of a datacenter 300 that is implementing a logical network. The overall logical network of the datacenter 300 includes several logical networks for several different tenants. Each tenant logical network includes various tenant logical entities such as tenant logical routers and tenant logical switches. The datacenter 300 also includes various provider logical entities such as provider logical routers and provider logical switches. The provider logical entities are shared by all of the tenants in order to access the external network through the gateway and to use the services provided the gateway.

The datacenter 300 includes a provider logical router (PLR) 390 and tenant logical routers (TLR) 310, 320, and 330 (TLR1, TLR2, and TLR3). The PLR 390 is connected with the TLR1 310 through a transit logical router 319 (TLS1), with the TLR2 320 through a transit logical router 329 (TLS2), and with the TLR3 330 through a transit logical router 339 (TLS3). TLR1 is for performing L3 routing of a tenant 1, TLR2 is for performing L3 routing of a tenant 2, and TLR3 is for performing L3 routing of a tenant 3. The logical networks of the different tenants are joined together by the PLR 390. The PLR 390 serves as the intermediate logical router between the various tenant logical networks and the external physical network (Internet).

In some embodiments, any number of TLRs may be attached to a PLR. Some datacenters may have only a single PLR to which all TLRs implemented in the datacenter attach, whereas other datacenters may have numerous PLRs. For instance, a large datacenter may want to use different PLR policies for different tenants, or may have too many different tenants to attach all of the TLRs to a single PLR. Part of the routing table for a PLR includes routes for all of the logical switch domains of its TLRs, so attaching numerous TLRs to a PLR creates several routes for each TLR just based on the subnets attached to the TLR. The PLR 390, as shown in the figure, provides a connection to the external physical network 399; some embodiments only allow the PLR to provide such a connection, so that the datacenter provider can manage this connection. Each of the separate TLRs 310, 320 and 330, though part of the overall logical network 300, are configured independently (although a single tenant could have multiple TLRs if they so chose).

Each logical router (TLR or PLR) described above is implemented by a single distributed routing component (DR) and a set of service routing components (SRs). The PLR includes service routers 301-303 (SR1, SR2, and SR3) that provides access to the physical network and edge services. As mentioned, in some embodiments, each service router is a centralized logical router component that is active only in one physical (gateway) machine. The PLR also includes a distributed router 305 (PLR-DR) for routing packets to and from the different tenant logical networks. The PLR distributed router 305 is connected to the service routers SR1, SR2, and SR3 through a transit logical switch (PLR-TLS) 309.

The TLR 310 includes service routers 311 and 312 (TLR1-SR1, TLR1-SR2), distributed router 314 (TLR1-DR), and a transit logical switch 313 (TLR1-TLS). Each TLR serve as the L3 hub for a tenant logical network. Each TLR includes a distributed router (DR) for connecting different L2 segments defined by different logical switches. The distributed router 314 (TLR1-DR) is for routing packets to and from the different tenant logical switches (LS-A and LS-B). The transit logical switch 313 is for connecting the service routers 311 and 312 with the distributed router 314. For simplicity, the details of TLR 320 and 330 are not illustrated, but these other TLRs would each have their own DR, as well as SRs in some cases.

For a PLR logical router, some embodiments use active-active mode whenever possible, and only use active-standby mode when stateful services (e.g., NAT, firewall, load balancer, etc.) are configured for the PLR. In active-standby mode, only one of the service routing components is active, i.e., fully operational at a time, and only this active routing component sends out messages to attract traffic. All other service routing components are in standby mode. In some embodiments, the active service component and a standby service component use the same IP address, but different MAC addresses, for communicating with the distributed component. However, only the active component replies to address resolution protocol (ARP) requests from this distributed component. Furthermore, only the active service component advertises routes to the external network to attract traffic.

For a TLR logical router, some embodiments either use no service components or two service components in active-standby mode when stateful services are configured for the TLR. (The TLR 310 in the example of FIG. 3 has two service components 311 and 312.) The TLR operates internally in the same manner as a PLR in active-standby mode, i.e., having an active component and a standby component sharing the same network layer address, but only the active component responding to ARP requests. To connect to the PLR, some embodiments assign each of the two service components of the TLR a same network layer address (though different from the IP address used to connect to its own distributed component).

Different types of logical routers (e.g., distributed logical router, multi-layer logical routers, etc.) with multiple routing components and implementation of the different types of logical routers on gateways and managed forwarding elements operating on host machines of a datacenter are described in greater detail in the U.S. patent application Ser. No. 14/814,473, filed Jul. 30, 2015, now issued as U.S Pat. No. 9,787,605, which is incorporated herein by reference.

Figure 4:
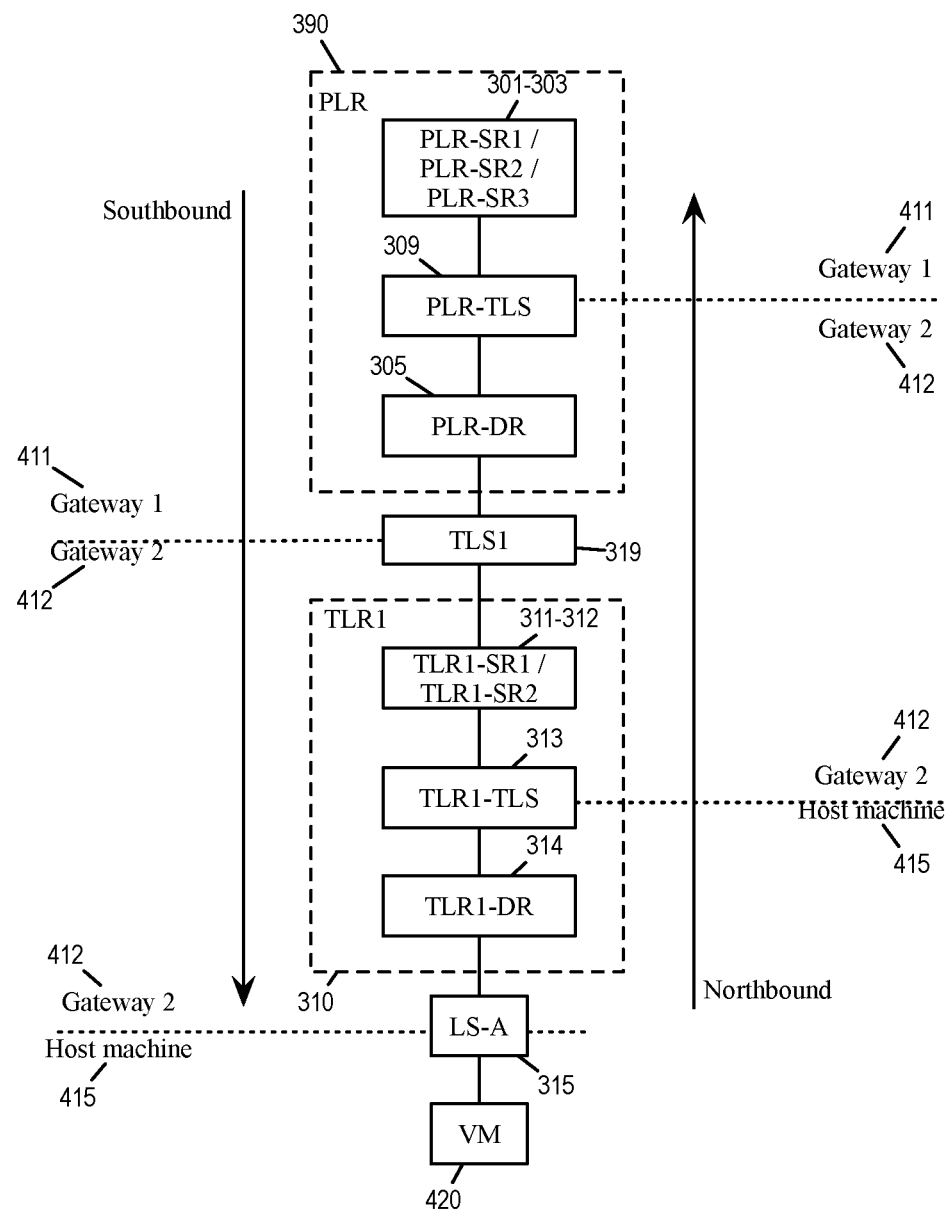
FIG. 4 illustrates example northbound and southbound traffic through logical forwarding elements operated by virtual network forwarding engines at the edge of an overall logical network.

In some embodiments, a virtual network forwarding engine that serves as an edge or a gateway operates several logical forwarding element in the two-tier logical network structure. FIG. 4 illustrates example northbound and southbound traffic through logical forwarding elements operated by virtual network forwarding engines at the edge of the overall logical network 300. The figure illustrates two virtual network forwarding engines 411 and 412 that serve as the gateways/edges of the overall logical network 300. Northbound traffic and southbound traffic flow through these two gateways and are processed by the logical forwarding elements operated by these two gateways. (For some embodiments, "northbound" traffic of a logical network refers to network traffic from the virtual machines of logical network toward the external physical networks, while "southbound" traffic refers to network traffic from the external physical networks toward the logical network and its virtual machines.) The example northbound and southbound traffic belong to a tenant that owns the tenant logical network TLR1.

As illustrated, northbound traffic from a VM 420 in a host machine 415 is processed by logical forwarding elements operated by the host machine 415, including logical switch A 315, logical router TLR1-DR 314, and logical switch TLR1-TLS 313. The northbound traffic is then forwarded to the gateway 412 and processed by the logical forwarding elements operating in the gateway 412, including the logical switch TLR1-TLS 313, the logical router TLR1-SR1 311 (or TLR1-SR2 312), the logical switch TLS1 319, the logical router PLR-DR 305, and the logical switch PLR-TLS 309. The northbound traffic is then again forwarded to the gateway 411 and processed by the logical forwarding elements operating in the gateway 411, including the logical switch PLR-TLS 309 and the logical router PLR-SR1 301 (or PLR-SR2 302 or PLR-SR3 303). The northbound traffic then exits the gateway 411 and into the external physical network 399.

Southbound traffic is likewise processed by logical forwarding elements operated by the gateways 411 and 412. In some embodiments, a gateway operates a different set of logical forwarding elements for some packets going northbound than going southbound. As illustrated, southbound traffic from the external physical network 399 enters the gateway 411 and is processed by logical forwarding elements operating in the gateway 411, including the logical router PLR-SR1 301 (or PLR-SR2 302 or PLR-SR3 303), the logical switch PLR-TLS 309, and the logical switch TLS1 319. The southbound traffic then goes on to the gateway 412 and is processed by the logical forwarding elements operating in the gateway 412, including the logical switch TLS1 319, the logical router TLR1-SR1 311 (or TLR1-SR2 312), the logical switch TLR1-TLS 313, the logical router TLR1-DR 314, and the logical switch LS-A 315. The southbound traffic then goes to the host machine 415, who operates the logical switch LS-A 315 and forwards the traffic to the VM 420.

II. Path Traversal

A troubleshooting system according to some embodiments of the invention retrieves a set of network data from a virtual network forwarding engine, identifies a path in the logical network by traversing a set of nodes in the logical network, and reports the set of traversed network nodes through a user interface (command line interface of graphical user interface). The traversal of the network node is done according to the set of network data retrieved from the virtual network engine. In other words, the virtual network engine from which the network data is retrieved is the engine that is being monitored, and the troubleshooting system is for identifying errors in operations of the monitored virtual network forwarding engine through the retrieved network data.

In some embodiments, the troubleshooting system identifies the requested path by emulating the forwarding/switching/routing of a packet by the virtual network forwarding engine. The troubleshooting system does so by performing packet forwarding operations based on the content of network data retrieved from the virtual network forwarding engine, which includes information about the logical forwarding elements operated by the virtual network forwarding engine. These information includes mapping/specification of connections between the various logical forwarding elements as well as forwarding tables and routing tables of the various logical forwarding elements. Hence, if any of the forwarding tables or routing tables stored in the monitored virtual network forwarding engine contains an error, the troubleshooting system may report an erroneous path, such as a path that does reach the requested destination.

Figure 5A:
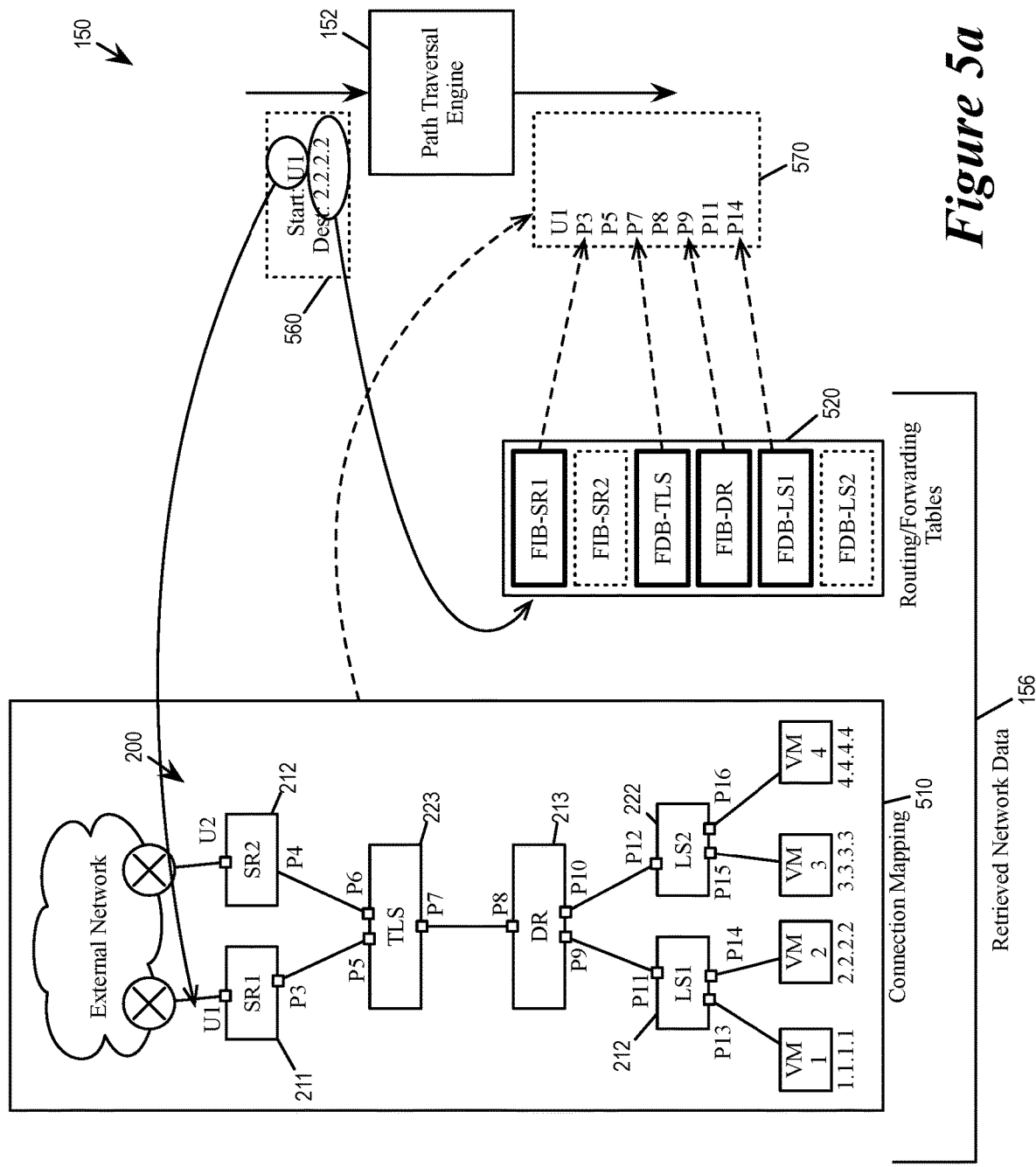
FIG. 5a illustrates the traversal of a logical network based on the network data retrieved from a virtual network forwarding engine.

FIG. 5a illustrates the traversal of a logical network based on the network data retrieved from a virtual network forwarding engine. The figure illustrates the troubleshooting system 150 identifying a traversal path 570 in response to a request 560 that specifies a starting network node/location and a destination network node/location in the logical network 200. The traversal is base on a set of network data 156 that is retrieve from a virtual network forwarding engine (e.g., the gateway 261). The retrieved network data 156 includes a connection mapping 510 and a set of tables 520. The set of tables 520 includes a L3 forwarding table (or forwarding information base FIB) "FIB-SR1" for the logical service router 211, a L3 forwarding table "FIB-SR2" for the logical service router 212, a L2 forwarding table (or forwarding database FDB) "FDB-TLS" for the logical switch 223, a L3 forwarding table "FIB-DR" for the logical router 213, a L2 forwarding table "FDB-LS1" for the logical switch 212, and a L2 forwarding table "FDB-LS2" for the logical switch 222.

As illustrated, the example request 560 specifies that the path is to start at a logical port U1 and end at a destination with IP address "2.2.2.2". The traversal engine 152 in turn starts its traversal through the logical network 200 with the logical port U1 as the first network node to be traversed. The traversal then uses the connection mapping 510 and the set of forwarding tables and routing tables 520 to identify a path of network nodes (or network hops) with the IP address "2.2.2.2" as the destination. In other words, the traversal engine 152 emulates packet-forwarding operation that would have been performed by the monitored virtual network forwarding engine for a packet that is destined for IP address "2.2.2.2".

In the illustrated example, the path traversal engine 152 uses the connection mapping 510 to identify U1 as an ingress logical port for the logical router SR1 211, then uses the L3 forwarding table for SR1 (FIB-SR1) to identify an egress port based on the IP address "2.2.2.2", which is "P3". The path traversal engine 152 uses the connection mapping 510 to identify "P3" as connected to an ingress logical port P5 of the logical switch TLS 223, then uses the L2 forwarding table for TLS (FDB-TLS) to identify an egress port "P7" based on the destination IP address "2.2.2.2" or an earlier determined next hop MAC address. The path traversal engine 152 uses the connection mapping 510 to identify "P7" as connected to an ingress logical port P8 of the logical router DR 213, then uses the L3 forwarding table for DR (FIB-SR) to identify an egress port "P9" based on the destination IP address "2.2.2.2". The path traversal engine 152 uses the connection mapping 510 to identify "P9" as connected to an ingress logical port P11 of the logical switch LS1 212, then uses the L2 forwarding table for LS1 (FDB-LS1) to identify an egress port "P14" based on the destination IP address "2.2.2.2" or an earlier determined next hop MAC address.

As the path traversal engine traverses through the various logical forwarding elements and their corresponding logical ports, it also records the logical ports it has traversed as the reported path 570, which lists a sequence of ports "U1", "P3", "P5", "P7", "P8", "P9" "P11", and "P14" as the path from the starting network location U1 to the destination IP address "2.2.2.2".

Figure 5B:
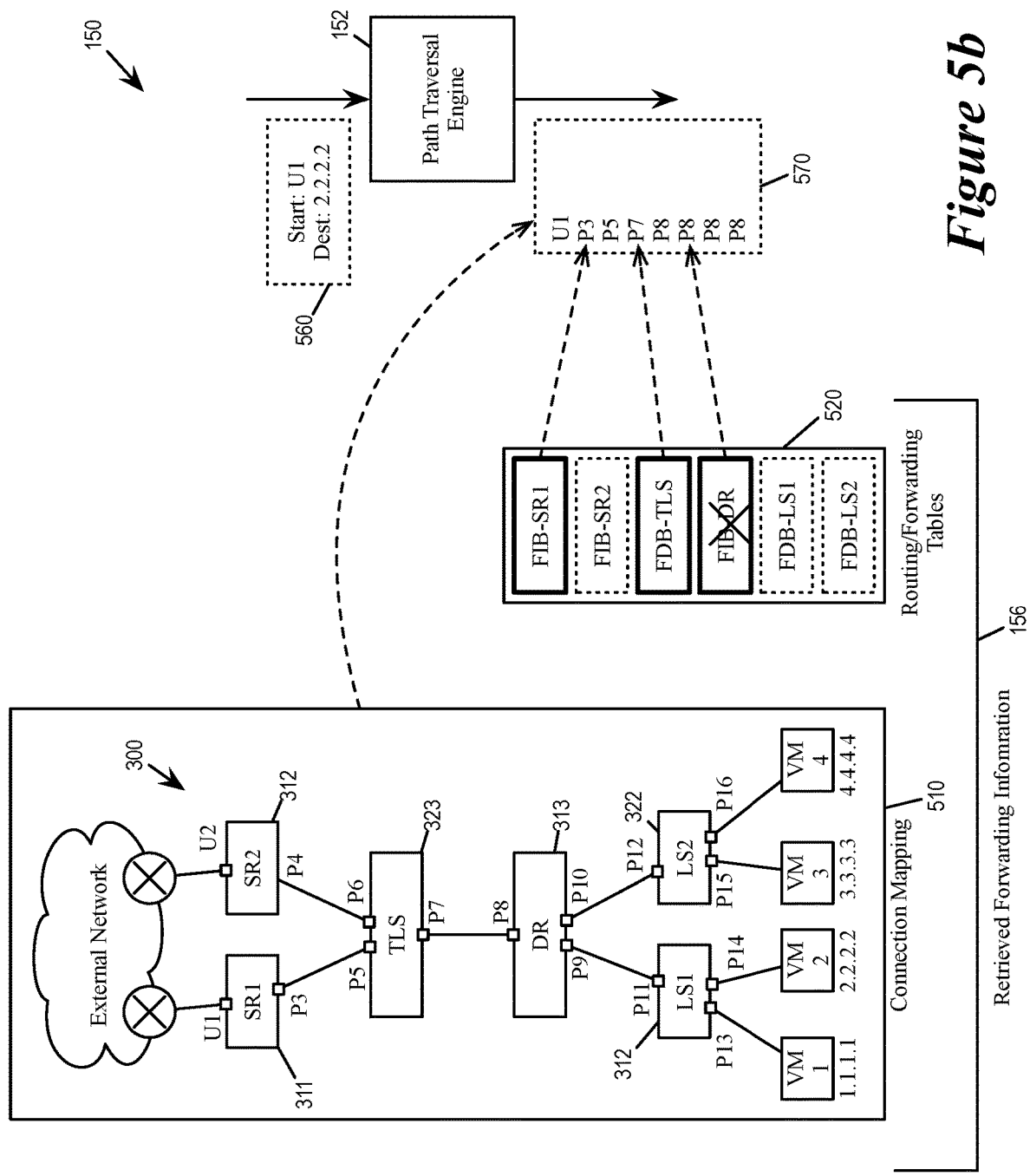
FIG. 5b illustrates the traversal of a logical network by a troubleshooting system when there is error in the monitored virtual network forwarding engine.

FIG. 5b illustrates the traversal of the logical network 110 by the troubleshooting system 150 when there is error in the monitored virtual network forwarding engine. The error is reflected in the retrieved network data 156, specifically in the L3 forwarding table "FIB-DR" for the logical router 313. As a result of the error, the path traversal engine 570 is not able to proceed correctly from the logical port "P8" to the intended egress logical port. In this example, this causes the path to be stuck at "P8" and never reaching the destination. One of ordinary skill would understand that the error illustrated in the figure is for illustrative purpose only. There are many other possibilities of errors manifesting itself in the identified path. For example, errors in the routing or forwarding tables can cause the path to show a loop repeating a sequence of several logical ports.

The examples of FIG. 5a-b only shows one example of a logical network that includes straightforward L2 logical switching and L3 logical routing. In some embodiments, the monitored forwarding engine can include other types of logical entity or logical forwarding element that may effect the path or whether a packet reach the requested destination. For example, in some embodiments, the monitored virtual network forwarding engine may implement services such as firewall, load balancing (LB), or network address translation (NAT). In some embodiments, the traversal engine would retrieve network data that includes firewall rules so that the troubleshooting engine would apply those retrieved rule when traversing the logical network toward the requested destination (e.g., if the firewall rule would prevent a packet with the destination IP address, the traversal engine would in some embodiments not be able to traverse through the firewall). In some embodiments, the traversal engine would perform address translation and translate the destination IP address in the request (e.g., 560) into some other address as it traverses a logical forwarding element that performs NAT.

Figure 6:
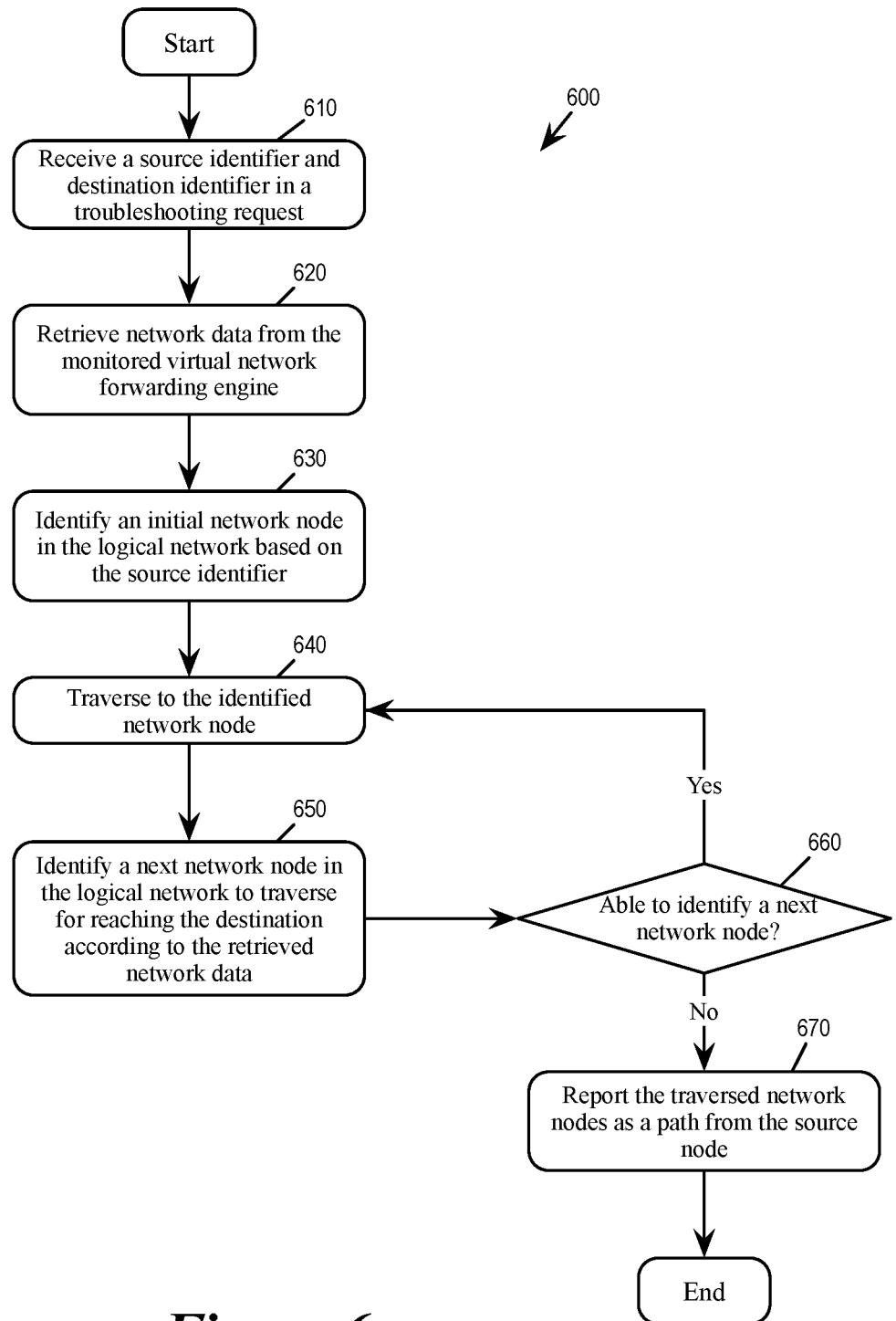
FIG. 6 conceptually illustrates a process for troubleshooting a virtual network forwarding engine with respect to a logical network.

FIG. 6 conceptually illustrates a process 600 for troubleshooting a virtual network forwarding engine with respect to a logical network. A troubleshooting system (e.g., 150) in some embodiments performs the process 600 when it receives a request for traversing a path based on network data stored in a virtual network forwarding engine. In some embodiments, the troubleshooting system is provided by a computing device that is separate from the virtual network forwarding engine being monitored (e.g., a computing device that is not the host machine that is serving as a virtual network forwarding engine). In some embodiments, the troubleshooting system is provided by a piece of software running on the host machine that also operating the virtual network forwarding engine being monitored.

The process starts when it receives (at 610) troubleshooting request that includes a source identifier and a destination identifier. This indicates the starting network location and the target network location of a logical network. The process then retrieves (at 620) network data from the virtual network engine that is being monitored, which is a host machine that implements the logical forwarding elements of the logical network. In some embodiments, this monitored virtual network forwarding engine is a gateway or an edge of the logical network.

Figure 7:
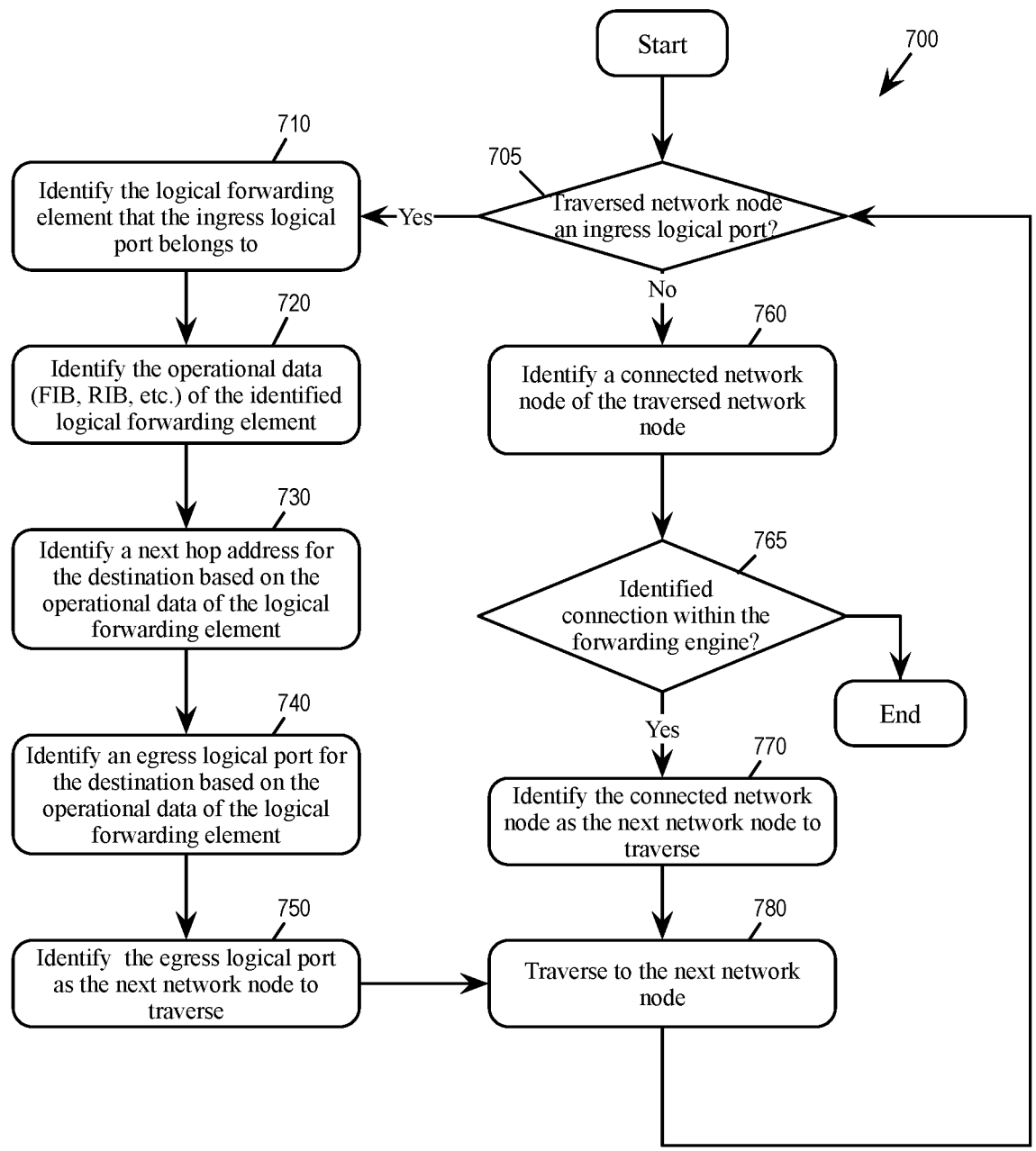
FIG. 7 conceptually illustrates a process for traversing from one network node to another according to the retrieved network data from the monitored virtual network forwarding engine.

The process then identifies (at 630) an initial network node or location in the logical network based on the source identifier in the received request. The process then traverses (at 640) to the identified initial network node. The process then identifies (at 650) a next network node in the logical network to traverse for reaching the destination according to the retrieved network data. For some embodiments, this operation is described by reference to FIGS. 5a-b above. FIG. 7 below describes a process 700 that is performed during the operation 650.

The process determines (at 660) whether it is able to identify a next network node for reaching the destination according to the retrieved network data. If so, the process returns to 640. If the process is not able to identify a next network node to traverse, e.g., when the connection mapping indicates that the next connected logical forwarding element is not implemented by the monitored virtual network forwarding engine, the process proceeds to 670.

At 670, the process reports all of the traversed network nodes/locations as a path from the source node. This path may or may not reach the destination network node in some embodiments, depending on whether there is an error in the network data retrieved from the virtual network forwarding engine and whether the destination network node is implemented by the monitored virtual network forwarding engine. After reporting the requested path, the process 600 ends.

FIG. 7 conceptually illustrates a process 700 for traversing from one network node to another according to the retrieved network data from the monitored virtual network forwarding engine. The troubleshooting system in some embodiments performs this process 700 when it performs the operation 650 of the process 600.

The process starts when the troubleshooting system has traversed to a network node (i.e., has just completed the operation 640). The process then determines (at 705) whether the traversed network node is an ingress logical port of a logical forwarding element. Some embodiments make this identification based on a connection mapping (e.g., 510) provided by the network data retrieved from the virtual network forwarding engine. If the traversed node is an ingress port of a logical forwarding element, the process proceeds to 710. Otherwise (e.g., the node is an egress port) the process proceeds to 760.

At 710, the process identifies the logical forwarding element that the traversed node (i.e., the ingress port) belongs to. Some embodiments make this identification based on a connection mapping (e.g., 510) provided by the network data retrieved from the virtual network forwarding engine. The process identifies (at 720) the operational data of the identified logical forwarding element that owns the ingress logical port identified at operation 710. For a logical forwarding element that is a logical router, the operational data includes a routing table (RIB) and/or a L3 forwarding table (FIB). For a logical forwarding element that is a logical switch, the operational data includes a L2 forwarding table (FDB). In some embodiments, the operational data of the logical forwarding data can also include other types of data such as mapping data for address translation or rules database for firewall.

The process then identifies (at 730) a next hop address for the destination based on the operational data of the logical forwarding element. In some embodiments, this is done by using a L2 or L3 forwarding table (FDB or FIB) associated with the identified logical forwarding element to determine a next hop address and/or a next hop VNI based on the source and the destination addresses/identifiers of the requested path.

The process then identifies (at 740) an egress logical port for the destination based on the operational data of the logical forwarding element. In some embodiments, this is done by using a L2 or L3 forwarding table (FIB or FIB) associated with the identified logical forwarding element to identify an egress port based on the ingress port and/or the source and the destination addresses/identifiers of the requested path. The process then identifies (at 750) the egress logical port as the next network node to traverse and traverses (at 780) to the next network node. The process then returns to the operation 705.

At 760, the process identifies a network node that is connected to the traversed node. At this operation, the process 700 has determined that the traversed node is an egress node, so it uses the connection mapping to find out which network node is connected to this traversed node. This connected network node can be an ingress logical port of another logical forwarding element.

The process then determines (at 765) whether the identified connection is within (i.e., implemented by) the virtual network forwarding engine. This operation corresponds to the operation 660 of the process 600. If the identified connection is within the virtual network forwarding engine, the process identifies (770) the connected network node as the next network node to traverse and traverses (at 780) to the next network node before returning to the operation 710. If the identified connection is not within the virtual network forwarding engine, the process 700 ends.

In some embodiments in which the process 700 is performed as a part of the operation 650 of the process 600, the process 600 continue onto the operation 670 upon the end of process 700 in order to report the traversed network node as a path from the source node.

III. Troubleshooting CLI

As mentioned, the troubleshooting system in some embodiments provides a user interface (e.g., the user interface 152 of FIG. 1) for receiving a troubleshooting request and for displaying the path reported by the path traversal engine. In some embodiments, the user interface of the troubleshooting system has a command line interface (CLI).

In some embodiments, the CLI displays the reported traversal path as a list of logical ports, and the troubleshooting CLI allows the user to navigate through the reported path and to select a particular logical port or network node for detailed information.

Figure 8:
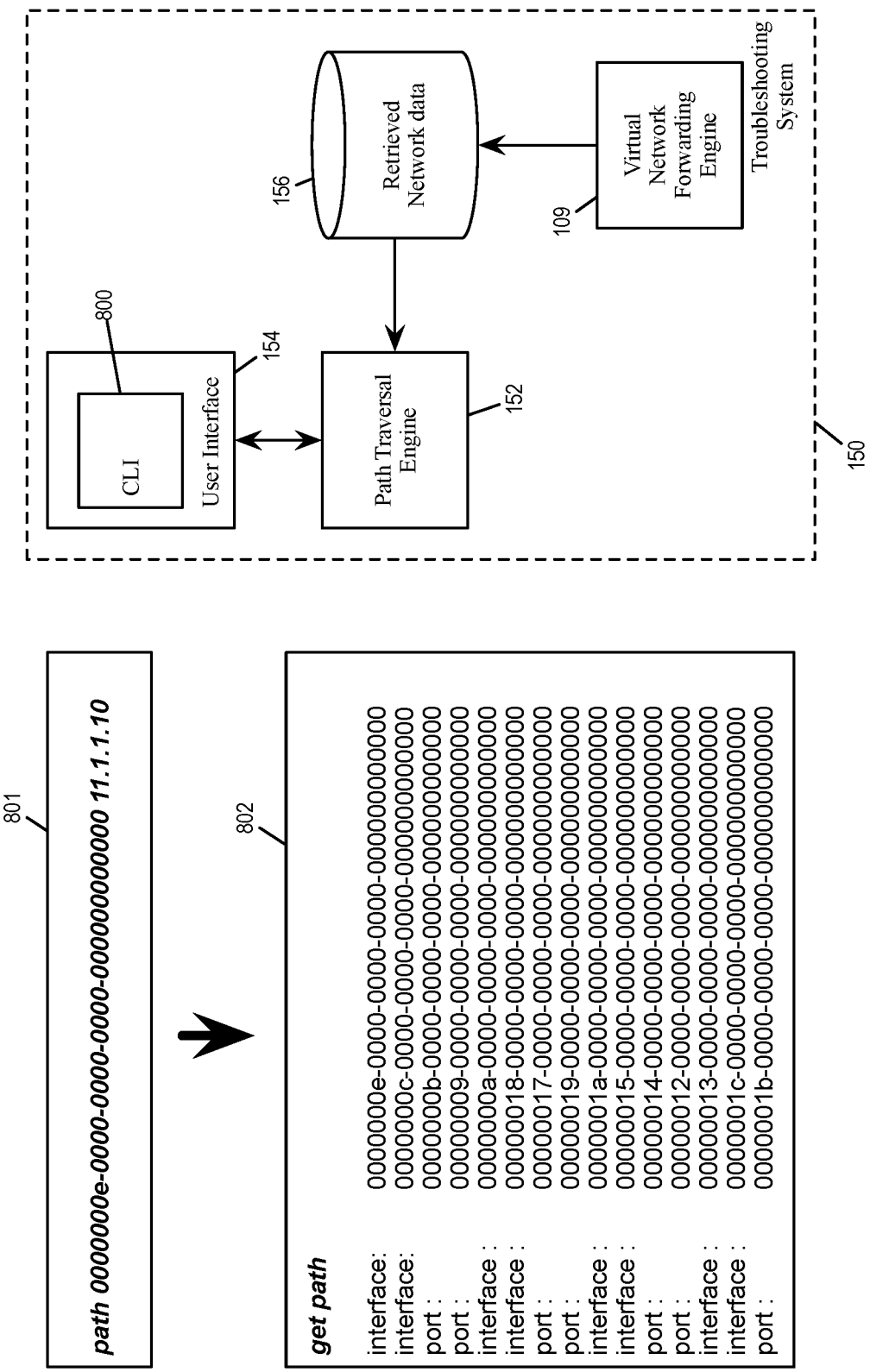
FIG. 8 illustrates an example CLI of a troubleshooting system.

FIG. 8 illustrates an example CLI 800 of the troubleshooting system 150. The troubleshooting system 150 includes the user interface 154, which sends commands to the path traversal engine 152. The path traversal engine in turn uses network data 156 retrieved from a virtual network forwarding engine 109 to identify a path. The CLI 800 is part of the user interface 154 of the troubleshooting system. FIG. 8 illustrates two screenshots 801 and 802 of the CLI 800. These two CLI screenshots corresponds to an example CLI command for receiving a troubleshooting request and an example CLI command to display the path that is identified according to the troubleshooting request.

The screenshot 801 illustrates a troubleshooting request command "path" that also specifies a starting network location and a destination network location. The starting network location "0000000e-0000-0000-0000-000000000000" is an UUID (universally unique identifier) for a logical port in the logical network. The destination network location "11.1.1.10" is the IP address of the ending/target/destination of the troubleshooting request. In some embodiments, the CLI sends the starting and destination network locations as a request to the path traversal engine (e.g., 152) to retrieve network data from a virtual network forwarding engine and to traverse a packet forwarding path based on the destination network location "11.1.1.10".

The screenshot 802 illustrates a command "get path" that causes the CLI to display the result of the path traversal. As illustrated, the "get path" command causes the CLI to dump out a list 850 of logical ports, each port identified by its UUID. In some embodiments, a traversed logical port of a logical switch is referred to as "port", while a traversed logical port of a logical router is referred to as "interface". The traversed path in the screenshot 802 includes both interfaces and ports.

In some embodiments, the CLI receives a selection a logical port from the reported set of traversed logical ports and reports a set of information related to the selected logical port. In some embodiments, the set of reported information can be of a logical forwarding element that the selected logical port is attached to, and the CLI provides a corresponding command. In some embodiments, such information includes a routing table and/or a forwarding table used by the logical forwarding element.

FIG. 9 illustrates the selection of a logical port and the reporting of information related to the selected logical port. The figure illustrates two screenshot 901 and 902 of the CLI. The screenshot 901 shows the list 850 of the traversed logical ports in response to the "get path" command. The screenshot 901 also shows the navigation of the logical ports in the list 850. As illustrated, the logical port with UUID "00000009-0000-0000-0000-000000000000" is highlighted, indicating that it is selected. In some embodiments, the CLI allows the user to select different logical ports in the displayed list by using keyboard (such as up/down arrow keys) to navigate the list and to select a logical port in the traversed path.

The screenshot 902 illustrates a command "get forwarding", which causes the CLI 800 to display the forwarding information regarding the logical forwarding element that owns the selected logical port (i.e., the highlighted UUID "00000009-0000-0000-0000-000000000000").

Figure 10:
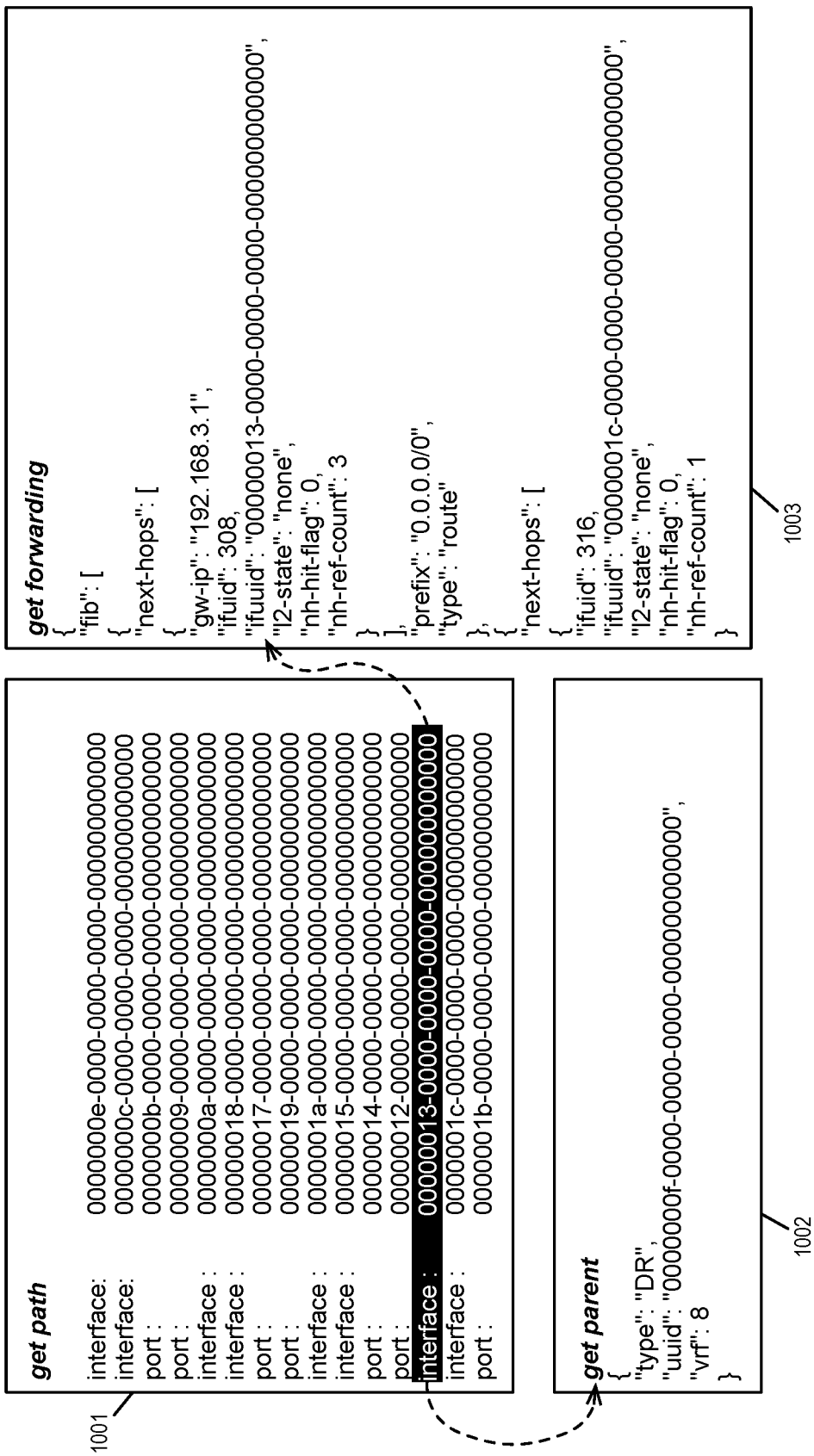
FIG. 10 illustrates the selection of a logical interface and the reporting of information related to the selected logical interface.

FIG. 10 illustrates the selection of a logical interface (i.e., the logical port of a logical router) and the reporting of information related to the selected logical interface. The figure illustrates three screenshots 1001-1003. The screenshot 1001 shows the list 850 of the traversed logical ports in response to the "get path" command. The screenshot 1001 also shows the selection of a logical interface with UUID "00000013-0000-0000-0000-000000000000". The screenshot 1002 shows a command "get parent", which display the information of the parent logical router for the selected logical interface. The screenshot 1003 shows a command "get forwarding", which display the forwarding information of the logical forwarding element that owns the selected logical interface.

FIG. 11 illustrates the selection of a logical port and the reporting of current information related to the selected logical port. The figure illustrates screenshots 1101 and 1102. The screenshot 1101 shows the list 850 of the traversed logical ports in response to the "get path" command. The screenshot 1101 also shows the selection of a logical port with UUID "00000012-0000-0000-0000-000000000000". The screenshot 1002 shows a command "get current", which display a set of current information regarding the selected logical port, such as a set of packet statistics 1012 that is observed at the logical port.

In some embodiments, the network data retrieved from the virtual network forwarding engine includes various packet statistics at various nodes/locations of the logical network. In some embodiments, such statistics are gathered/accumulated by the virtual network forwarding engine as it operate to forward packets according to the logical forwarding elements it implements. FIG. 11 illustrates the reporting of such statistics for one logical port. Some embodiments provide CLI command that dumps all packet statistics for all logical ports. This is useful for troubleshooting as it further assists the user to identify and locate the error, for example by observing where does packet loss occur. For some embodiments, FIG. 12 illustrates the reporting of packet statistics for all nodes in the traversed path 850.

Figures 13A, 13B:
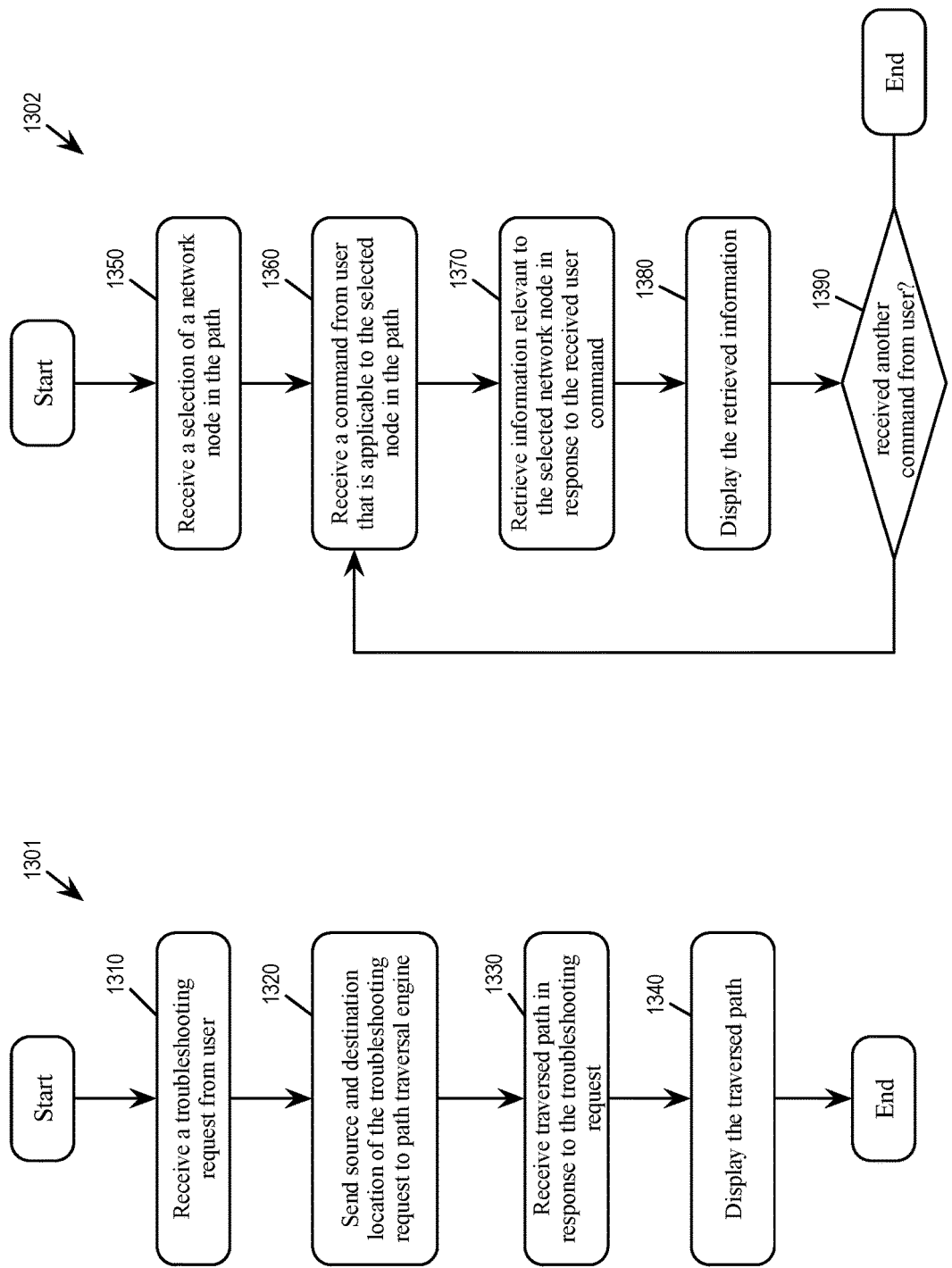
FIG. 13a conceptually illustrates a process for requesting the traversal of a path.
FIG. 13b conceptually illustrates a process for displaying information of a specific, selected logical port.

FIG. 13a conceptually illustrates a process 1301 for requesting the traversal of a path. FIG. 13b conceptually illustrates a process 1302 for displaying information of a specific, selected logical port. In some embodiments, the processes 1301 and 1302 are performed by a user interface of a troubleshooting system through a CLI.

The process 1301 starts when it receives (at 1310) a troubleshooting request. Such a troubleshooting request in some embodiments includes a starting network location and a target/destination network location. The process then sends (1320) the source/start locations of the troubleshooting request to a path traversal engine (e.g., 152). Next, the process receives (at 1330) a traversed path from the path traversal engine, which traversed the logical network based on network data retrieved from a virtual network forwarding engine in response to the troubleshooting request. The process then displays (at 1340) the traversed path and ends.

The process 1302 starts after the CLI has received a traversed path and is displaying it. The process then receives (at 1350) a selection of a network node in the list of network nodes in the path. In the example discussed by reference to FIGS. 9-11, the selected network node (logical port or interface) is highlighted.

The process then receives (at 1360) and command from the user that is applicable to the selected network node. The process then retrieves (at 1370) information relevant to the selected network node from the retrieved network data in response to the command. For example, if the command were for displaying the forwarding information related to the selected logical port (e.g., "get forward" of FIG. 9), the process would retrieve the forwarding information for the selected logical port. The process then displays (at 1380) the retrieved information. Next, the process determines (at 1390) if it has received another command from the user through the CLI. If so, the process returns to 1360. Otherwise the process 1302 ends.

IV. Computing Device & Virtualization Software

Figure 14:
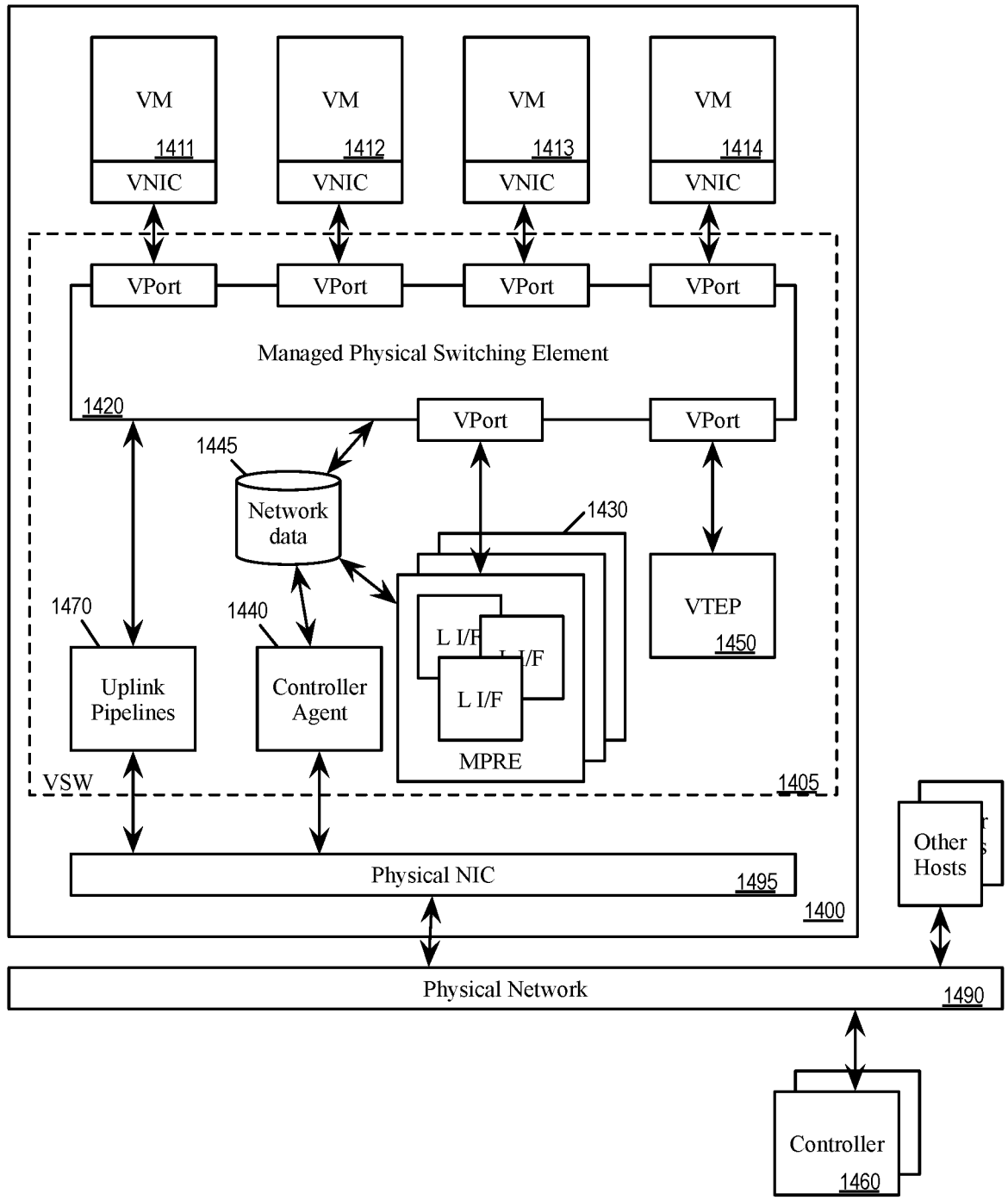
FIG. 14 illustrates a computing device that serves as a host machine that runs virtualization software for some embodiments of the invention.

In some embodiments, a host machine that is serving as a virtual network forwarding engine operates virtualization software, which is also known as managed forwarding element (MFE) or hypervisors. Virtualization software allows a computing device to host a set of virtual machines (VMs) as well as to perform packet-forwarding operations (including L2 switching and L3 routing operations). These computing devices are therefore also referred to as host machines. The packet forwarding operations of the virtualization software are managed and controlled by a set of central controllers, and therefore the virtualization software is also referred to as a managed software forwarding element (MSFE) in some embodiments. In some embodiments, the MSFE perform its packet forwarding operations for one or more logical forwarding elements as the virtualization software of the host machine operates local instantiations of the logical forwarding elements as physical forwarding elements. Some of these physical forwarding elements are managed physical routing elements (MPREs) for performing L3 routing operations for a logical routing element (LRE), some of these physical forwarding elements are managed physical switching elements (MPSEs) for performing L2 switching operations for a logical switching element (LSE). FIG. 14 illustrates a computing device 1400 that serves as a host machine that runs virtualization software for some embodiments of the invention.

As illustrated, the computing device 1400 has access to a physical network 1490 through a physical NIC (PNIC) 1495. The host machine 1400 also runs the virtualization software 1405 and hosts VMs 1411-1414. The virtualization software 1405 serves as the interface between the hosted VMs and the physical NIC 1495 (as well as other physical resources, such as processors and memory). Each of the VMs includes a virtual NIC (VNIC) for accessing the network through the virtualization software 1405. Each VNIC in a VM is responsible for exchanging packets between the VM and the virtualization software 1405. In some embodiments, the VNICs are software abstractions of physical NICs implemented by virtual NIC emulators.

The virtualization software 1405 manages the operations of the VMs 1411-1414, and includes several components for managing the access of the VMs to the physical network (by implementing the logical networks to which the VMs connect, in some embodiments). As illustrated, the virtualization software includes several components, including a MPSE 1420, a set of MPREs 1430, a controller agent 1440, a network data storage 1445, a VTEP 1450, and a set of uplink pipelines 1470.

The VTEP (VXLAN tunnel endpoint) 1450 allows the host machine 1400 to serve as a tunnel endpoint for logical network traffic (e.g., VXLAN traffic). VXLAN is an overlay network encapsulation protocol. An overlay network created by VXLAN encapsulation is sometimes referred to as a VXLAN network, or simply VXLAN. When a VM on the host 1400 sends a data packet (e.g., an Ethernet frame) to another VM in the same VXLAN network but on a different host, the VTEP will encapsulate the data packet using the VXLAN network's VNI and network addresses of the VTEP, before sending the packet to the physical network. The packet is tunneled through the physical network (i.e., the encapsulation renders the underlying packet transparent to the intervening network elements) to the destination host. The VTEP at the destination host decapsulates the packet and forwards only the original inner data packet to the destination VM. In some embodiments, the VTEP module serves only as a controller interface for VXLAN encapsulation, while the encapsulation and decapsulation of VXLAN packets is accomplished at the uplink module 1470.

The controller agent 1440 receives control plane messages from a controller or a cluster of controllers. In some embodiments, these control plane message includes configuration data for configuring the various components of the virtualization software (such as the MPSE 1420 and the MPREs 1430) and/or the virtual machines. In the example illustrated in FIG. 14, the controller agent 1440 receives control plane messages from the controller cluster 1460 from the physical network 1490 and in turn provides the received configuration data to the MPREs 1430 through a control channel without going through the MPSE 1420. However, in some embodiments, the controller agent 1440 receives control plane messages from a direct data conduit (not illustrated) independent of the physical network 1490. In some other embodiments, the controller agent receives control plane messages from the MPSE 1420 and forwards configuration data to the router 1430 through the MPSE 1420.

The network data storage 1445 in some embodiments stores some of the data that are used and produced by the logical forwarding elements of the host machine 1400, logical forwarding elements such as the MPSE 1420 and the MPRE 1430. Such stored data in some embodiments include forwarding tables and routing tables, connection mapping, as well as packet traffic statistics. These stored data are accessible by the controller agent 1440 in some embodiments and delivered to another computing device that is operating the troubleshooting system (e.g., 150).

The MPSE 1420 delivers network data to and from the physical NIC 1495, which interfaces the physical network 1490. The MPSE also includes a number of virtual ports (vPorts) that communicatively interconnects the physical NIC with the VMs 1411-1414, the MPREs 1430 and the controller agent 1440. Each virtual port is associated with a unique L2 MAC address, in some embodiments. The MPSE performs L2 link layer packet forwarding between any two network elements that are connected to its virtual ports. The MPSE also performs L2 link layer packet forwarding between any network element connected to any one of its virtual ports and a reachable L2 network element on the physical network 1490 (e.g., another VM running on another host). In some embodiments, a MPSE is a local instantiation of a logical switching element (LSE) that operates across the different host machines and can perform L2 packet switching between VMs on a same host machine or on different host machines. In some embodiments, the MPSE performs the switching function of several LSEs according to the configuration of those logical switches.

The MPREs 1430 perform L3 routing on data packets received from a virtual port on the MPSE 1420. In some embodiments, this routing operation entails resolving L3 IP address to a next-hop L2 MAC address and a next-hop VNI (i.e., the VNI of the next-hop's L2 segment). Each routed data packet is then sent back to the MPSE 1420 to be forwarded to its destination according to the resolved L2 MAC address. This destination can be another VM connected to a virtual port on the MPSE 1420, or a reachable L2 network element on the physical network 1490 (e.g., another VM running on another host, a physical non-virtualized machine, etc.).

As mentioned, in some embodiments, a MPRE is a local instantiation of a logical routing element (LRE) that operates across the different host machines and can perform L3 packet forwarding between VMs on a same host machine or on different host machines. In some embodiments, a host machine may have multiple MPREs connected to a single MPSE, where each MPRE in the host machine implements a different LRE. MPREs and MPSEs are referred to as "physical" routing/switching element in order to distinguish from "logical" routing/switching elements, even though MPREs and MPSE are implemented in software in some embodiments. In some embodiments, a MPRE is referred to as a "software router" and a MPSE is referred to a "software switch". In some embodiments, LREs and LSEs are collectively referred to as logical forwarding elements (LFEs), while MPREs and MPSEs are collectively referred to as managed physical forwarding elements (MPFEs). Some of the logical resources (LRs) mentioned throughout this document are LREs or LSEs that have corresponding local MPREs or local MPSE running in each host machine.

In some embodiments, the MPRE 1430 includes one or more logical interfaces (LIFs) that each serves as an interface to a particular segment (L2 segment or VXLAN) of the network. In some embodiments, each LIF is addressable by its own IP address and serve as a default gateway or ARP proxy for network nodes (e.g., VMs) of its particular segment of the network. In some embodiments, all of the MPREs in the different host machines are addressable by a same "virtual" MAC address (or vMAC), while each MPRE is also assigned a "physical" MAC address (or pMAC) in order indicate in which host machine does the MPRE operate.

The uplink module 1470 relays data between the MPSE 1420 and the physical NIC 1495. The uplink module 1470 includes an egress chain and an ingress chain that each performs a number of operations. Some of these operations are pre-processing and/or post-processing operations for the MPRE 1430. The operations of LIFs, uplink module, MPSE, and MPRE are described in U.S. patent application Ser. No. 14/137,862 filed on Dec. 20, 2013, titled "Logical Router", published as U.S. Patent Application Publication 2015/0106804.

As illustrated by FIG. 14, the virtualization software 1405 has multiple MPREs for multiple different LREs. In a multi-tenancy environment, a host machine can operate virtual machines from multiple different users or tenants (i.e., connected to different logical networks). In some embodiments, each user or tenant has a corresponding MPRE instantiation of its LRE in the host for handling its L3 routing. In some embodiments, though the different MPREs belong to different tenants, they all share a same vPort on the MPSE 1420, and hence a same L2 MAC address (vMAC or pMAC). In some other embodiments, each different MPRE belonging to a different tenant has its own port to the MPSE.

The MPSE 1420 and the MPRE 1430 make it possible for data packets to be forwarded amongst VMs 1411-1414 without being sent through the external physical network 1490 (so long as the VMs connect to the same logical network, as different tenants' VMs will be isolated from each other). Specifically, the MPSE performs the functions of the local logical switches by using the VNIs of the various L2 segments (i.e., their corresponding L2 logical switches) of the various logical networks. Likewise, the MPREs perform the function of the logical routers by using the VNIs of those various L2 segments. Since each L2 segment/L2 switch has its own a unique VNI, the host machine 1400 (and its virtualization software 1405) is able to direct packets of different logical networks to their correct destinations and effectively segregates traffic of different logical networks from each other.

V. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 15:
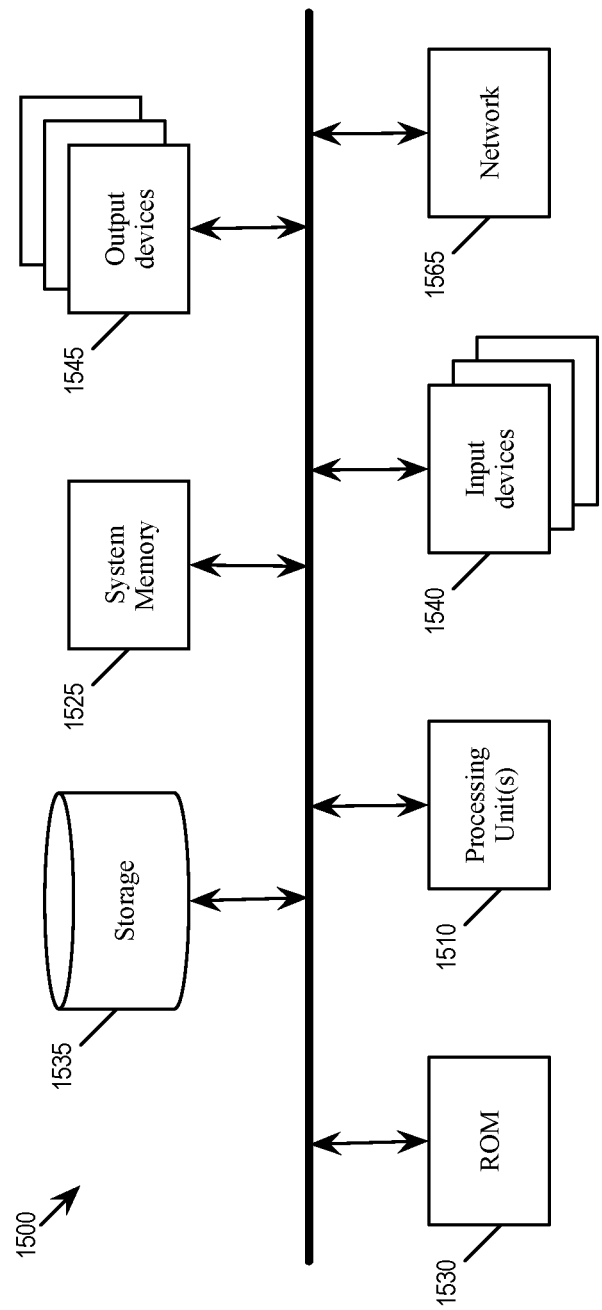
FIG. 15 conceptually illustrates an electronic system with which some embodiments of the invention are implemented.

FIG. 15 conceptually illustrates an electronic system 1500 with which some embodiments of the invention are implemented. The electronic system 1500 can be used to execute any of the control, virtualization, or operating system applications described above. The electronic system 1500 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1500 includes a bus 1505, processing unit(s) 1510, a system memory 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the system memory 1525, and the permanent storage device 1535.

From these various memory units, the processing unit(s) 1510 retrieves instructions to execute and data to process in order to execute the processes of the invention. The processing unit(s) may be a single processor or a multi-core processor in different embodiments.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive) as the permanent storage device 1535.

Other embodiments use a removable storage device (such as a floppy disk, flash drive, etc.) as the permanent storage device. Like the permanent storage device 1535, the system memory 1525 is a read-and-write memory device. However, unlike storage device 1535, the system memory is a volatile read-and-write memory, such a random access memory. The system memory stores some of the instructions and data that the processor needs at runtime. In some embodiments, the invention's processes are stored in the system memory 1525, the permanent storage device 1535, and/or the read-only memory 1530. From these various memory units, the processing unit(s) 1510 retrieves instructions to execute and data to process in order to execute the processes of some embodiments.

The bus 1505 also connects to the input and output devices 1540 and 1545. The input devices enable the user to communicate information and select commands to the electronic system. The input devices 1540 include alphanumeric keyboards and pointing devices (also called "cursor control devices"). The output devices 1545 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 15, bus 1505 also couples electronic system 1500 to a network 1565 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

In this document, the term "packet" refers to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

A hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 6, 7, and 13a-b) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method comprising:
receiving, at a user interface, a troubleshooting request for a logical network comprising a plurality of logical forwarding elements;
sending source and destination identifiers associated with the troubleshooting request to a path traversal engine that directs the path traversal engine to identify a traversed path from the source machine to the destination machine through a set of traversed network nodes by collecting forwarding table entries from a set of logical forwarding elements and analyzing the forwarding table entries to emulate a path through the logical network between the source and destination machines;
receiving the traversed path from the path traversal engine for display on the user interface; and
in response to receiving a user selection of a traversed network node from the traversed path displayed on the user interface, retrieving a set of forwarding table entries associated with a logical forwarding element that owns the selected network node, the retrieved set of forwarding table entries for display on the user interface.

2. The method of claim 1, wherein sending the source and destination identifiers comprises sending a command to identify a path comprising the source and destination identifiers.

3. The method of claim 2, wherein the source identifier is a universally unique identifier (UUID).

4. The method of claim 2, wherein the destination identifier is an Internet Protocol (IP) address.

5. The method of claim 1, wherein the received traversed path comprises a list of (i) logical ports associated with a set of logical switches and (ii) logical interfaces associated with a set of logical routers.

6. The method of claim 1, wherein retrieving the set of forwarding table entries comprises:
receiving a command to retrieve the set of forwarding table entries;
based on the received command, identifying the set of forwarding table entries for retrieval; and
retrieving the identified set of forwarding table entries for display on the user interface.

7. A method comprising:
receiving, at a user interface, a troubleshooting request for a logical network comprising a plurality of logical forwarding elements;
sending source and destination identifiers associated with the troubleshooting request to a path traversal engine that directs the path traversal engine to identify a traversed path from the source machine to the destination machine through a set of traversed network nodes by collecting forwarding table entries from a set of logical forwarding elements and analyzing the forwarding table entries to emulate a path through the logical network between the source and destination machines;
receiving the traversed path from the path traversal engine for display on the user interface; and
in response to receiving a user selection of a traversed logical interface of a particular logical router from the traversed path displayed on the user interface, retrieving a set of information associated with the particular logical router, the retrieved set of information for display on the user interface.

8. The method of claim 7, wherein sending the source and destination identifiers comprises sending a command to identify a path comprising the source and destination identifiers.

9. A method comprising:
receiving, at a user interface, a troubleshooting request for a logical network comprising a plurality of logical forwarding elements;
sending source and destination identifiers associated with the troubleshooting request to a path traversal engine that directs the path traversal engine to identify a traversed path from the source machine to the destination machine through a set of traversed network nodes by collecting forwarding table entries from a set of logical forwarding elements and analyzing the forwarding table entries to emulate a path through the logical network between the source and destination machines;
receiving the traversed path from the path traversal engine for display on the user interface; and
in response to receiving a user selection of a traversed logical port of a particular logical switch from the traversed path displayed on the user interface, retrieving a set of packet statistics observed at the logical port, the retrieved set of packet statistics for display on the user interface.

10. The method of claim 9, wherein the source identifier is a universally unique identifier (UUID) and the destination identifier is an Internet Protocol (IP) address.

11. A computing device comprising:
a set of processing units; and
a non-transitory machine readable medium storing a program comprising sets of instructions for:
receiving, at a user interface, a troubleshooting request for a logical network comprising a plurality of logical forwarding elements;
sending source and destination identifiers associated with the troubleshooting request to a path traversal engine that directs the path traversal engine to identify a traversed path from the source machine to the destination machine through a set of traversed network nodes by collecting forwarding table entries from a set of logical forwarding elements and analyzing the forwarding table entries to emulate a path through the logical network between the source and destination machines;
receiving the traversed path from the path traversal engine for display on the user interface; and
in response to receiving a user selection of a traversed network node from the traversed path displayed on the user interface, retrieving a set of forwarding table entries associated with a logical forwarding element that owns the selected network node, the retrieved set of forwarding table entries for display on the user interface.

12. The computing device of claim 11, wherein the set of instructions for sending the source and destination identifiers comprises a set of instructions for sending a command to identify a path comprising the source and destination identifiers.

13. The computing device of claim 12, wherein the source identifier is a universally unique identifier (UUID).

14. The computing device of claim 12, wherein the destination identifier is an Internet Protocol (IP) address.

15. The computing device of claim 11, wherein the received traversed path comprises a list of (i) logical ports associated with a set of logical switches and (ii) logical interfaces associated with a set of logical routers.

16. The computing device of claim 11, wherein the set of instructions for retrieving the set of data forwarding table entries comprises sets of instructions for:
receiving a command to retrieve the set of forwarding table entries;
based on the received command, identifying the set of data for retrieval; and
retrieving the identified set of data for display on the user interface.

17. A computing device comprising:
a set of processing units; and
a non-transitory machine readable medium storing a program comprising sets of instructions for:
receiving, at a user interface, a troubleshooting request for a logical network comprising a plurality of logical forwarding elements;
sending source and destination identifiers associated with the troubleshooting request to a path traversal engine that directs the path traversal engine to identify a traversed path from the source machine to the destination machine through a set of traversed network nodes by collecting forwarding table entries from a set of logical forwarding elements and analyzing the forwarding table entries to emulate a path through the logical network between the source and destination machines;
receiving the traversed path from the path traversal engine for display on the user interface; and
in response to receiving a user selection of a traversed logical interface of a particular logical router from the traversed path displayed on the user interface, retrieving a set of information associated with the particular logical router, the retrieved set of information for display on the user interface.

18. The computing device of claim 17, wherein the source identifier is a universally unique identifier (UUID) and the destination identifier is an Internet Protocol (IP) address.

19. A computing device comprising:
a set of processing units; and
a non-transitory machine readable medium storing a program comprising sets of instructions for:
receiving, at a user interface, a troubleshooting request for a logical network comprising a plurality of logical forwarding elements;
sending source and destination identifiers associated with the troubleshooting request to a path traversal engine that directs the path traversal engine to identify a traversed path from the source machine to the destination machine through a set of traversed network nodes by collecting forwarding table entries from a set of logical forwarding elements and analyzing the forwarding table entries to emulate a path through the logical network between the source and destination machines; receiving the traversed path from the path traversal engine for display on the user interface; and
in response to receiving a user selection of a traversed logical port of a particular logical switch from the traversed path displayed on the user interface, retrieving a set of packet statistics observed at the logical port, the retrieved set of packet statistics for display on the user interface.

20. The computing device of claim 19, wherein the set of instructions for sending the source and destination identifiers comprises a set of instructions for sending a command to identify a path comprising the source and destination identifiers.

* * * * *